US012071030B2

(12) United States Patent
Drayna et al.

(10) Patent No.: US 12,071,030 B2
(45) Date of Patent: Aug. 27, 2024

(54) CAMERA-SENSOR FUSION MODULE FOR SURFACE DETECTION AND FLEET VEHICLE CONTROL SYSTEMS AND METHODS

(71) Applicant: Lyft, Inc., San Francisco, CA (US)

(72) Inventors: Garrett Korda Drayna, San Carlos, CA (US); Jens Paul Windau, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 907 days.

(21) Appl. No.: 16/726,156

(22) Filed: Dec. 23, 2019

(65) Prior Publication Data

US 2021/0191424 A1    Jun. 24, 2021

(51) Int. Cl.
*G05D 1/02* (2020.01)
*B60L 50/20* (2019.01)
(Continued)

(52) U.S. Cl.
CPC ............ *B60L 50/20* (2019.02); *G05B 13/027* (2013.01); *G05D 1/0231* (2013.01); *G05D 1/027* (2013.01); *G05D 1/0291* (2013.01); *G06N 3/045* (2023.01); *G06N 3/08* (2013.01); *G06V 10/803* (2022.01); *G06V 10/82* (2022.01); *G06V 20/56* (2022.01);
(Continued)

(58) Field of Classification Search
CPC ...... B60L 50/20; B60L 15/20; B60L 2200/12; G05B 13/027; G05D 1/0231; G05D 1/027; G05D 1/0291; G05D 1/0278; G05D 2201/0212; G05D 1/0246; G05D 1/0297; G06N 3/045; G06N 3/08; G06N 3/048; G06V 10/803; G06V 10/82; G06V 20/56; G06F 18/251; G08G 1/0112; G08G 1/0129; G08G 1/0145; G08G 1/096716; G08G 1/096725; G08G 1/096741; G08G 1/096775; G08G 1/207
See application file for complete search history.

(56) References Cited

U.S. PATENT DOCUMENTS 9,246,432 B2 *  1/2016  Keen ............... H02P 29/025
10,245,937 B2 †  4/2019  Gillett
(Continued)

FOREIGN PATENT DOCUMENTS

JP          2007037294 A   *   2/2007

*Primary Examiner* — Anne Marie Antonucci
*Assistant Examiner* — Kyle S Park
(74) *Attorney, Agent, or Firm* — Baker Botts L.L.P.

(57) ABSTRACT

Techniques are disclosed for systems and methods for surface detection and fleet vehicle control. A method for controlling operations for a plurality of fleet vehicles, the method includes receiving, by a fleet vehicle of the plurality of fleet vehicles using camera-sensor fusion module, first image data of an operational surface in a field of view of the camera-sensor fusion module and inertial data of the fleet vehicle, determining, by the fleet vehicle using a fusion algorithm based on a neural network model, a surface classification of the operational surface based on the first image data and the inertial data, determining an operational parameter for the fleet vehicle based, at least in part, on the surface classification, and controlling an operation of the fleet vehicle based, at least in part, on the operational parameter.

19 Claims, 12 Drawing Sheets

(51) Int. Cl.
*G05B 13/02* (2006.01)
*G05D 1/00* (2006.01)
*G06N 3/04* (2023.01)
*G06N 3/045* (2023.01)
*G06N 3/08* (2023.01)
*G06V 10/80* (2022.01)
*G06V 10/82* (2022.01)
*G06V 20/56* (2022.01)
*G07C 5/08* (2006.01)
*B60L 15/20* (2006.01)
*G06Q 30/04* (2012.01)

(52) U.S. Cl.
CPC ......... *G07C 5/0808* (2013.01); *G07C 5/0825* (2013.01); *G07C 5/0833* (2013.01); *G07C 5/085* (2013.01); *B60L 15/20* (2013.01); *G05D 1/0278* (2013.01); *G06Q 30/04* (2013.01)

(56) References Cited

U.S. PATENT DOCUMENTS

| | | | | |
|---|---|---|---|---|
| 10,810,445 | B1* | 10/2020 | Kangaspunta | G06T 3/4046 |
| 2019/0012551 | A1* | 1/2019 | Fung | G06V 20/584 |
| 2019/0064360 | A1* | 2/2019 | Pearlman | G01C 7/04 |
| 2019/0065945 | A1* | 2/2019 | Luo | G06N 3/04 |
| 2019/0250619 | A1† | 8/2019 | Gillett | |
| 2019/0303759 | A1* | 10/2019 | Farabet | G06V 10/82 |
| 2019/0383627 | A1* | 12/2019 | Nangeroni | B60W 50/0098 |
| 2020/0034638 | A1* | 1/2020 | Brewington | G06V 20/58 |
| 2020/0124430 | A1* | 4/2020 | Bradlow | B62J 45/412 |
| 2021/0182704 | A1* | 6/2021 | Mamo | G06N 5/04 |

\* cited by examiner
† cited by third party

CAMERA-SENSOR FUSION MODULE FOR SURFACE DETECTION AND FLEET VEHICLE CONTROL SYSTEMS AND METHODS

TECHNICAL FIELD

One or more embodiments of the present disclosure relate generally to image detection and more particularly, to systems and methods for camera-sensor fusion modules trained to detect surfaces and control a fleet vehicle's operation.

BACKGROUND

Contemporary transportation services and vehicles rely on users to control the mode of transportation, including the speed of travel, the location of travel, and other operations associated with use of the vehicle. For example, users may be required to comply with local ordinances, laws, and other rules for use of the vehicle, such as a speed limit, specific lanes for certain vehicle types, and/or control of the vehicle around pedestrians. Micro-mobility fleet service providers may provide micro-mobility vehicles, such as bicycles, scooters, and the like, that the users do not own but may rent from the service providers. In order to operate, rent, and provide these vehicles to users within a location (e.g., a city), the service provider may require licenses from the local government and may further be required to enforce the local laws so that the micro-mobility vehicles are not operated in unlawful manners, which may endanger pedestrians or vehicles. This may further impact the reputation of the service provider based on dangerous use by some users. Further, the service provider may lose their licensing to operate within the location and/or be fined based on unlawful use by users, which the service provider may be unaware of or unable to control with certain micro-mobility vehicles.

Therefore, there is a need in the art for systems and methods to better limit and control fleet vehicles, particularly in the context of micro-mobility fleet vehicles operated within a location that has rules and laws regulating micro-mobility fleet vehicle use.

SUMMARY

Techniques are disclosed for systems and methods to provide surface detection and fleet vehicle control. In accordance with one or more embodiments, a fleet vehicle control system for a plurality of fleet vehicles is provided, where the fleet vehicle control system includes one or more non-transitory computer-readable storage media embodying instructions and one or more processors coupled to the storage media and operable to execute the instructions. The instructions include receiving, by a fleet vehicle of the plurality of fleet vehicles, first image data of an operational surface on which the fleet vehicle is operated, the first image data captured by a camera associated with the fleet vehicle, determining, by the fleet vehicle using a neural network model trained for detection of operational surfaces associated with the plurality of fleet vehicles, a restricted mobility requirement or operational parameter for the fleet vehicle based, at least in part, on the first image data, and controlling an operation of the fleet vehicle based, at least in part, on the restricted mobility requirement.

In other embodiments, a method for controlling operations for a plurality of fleet vehicles is provided, the method including receiving, by a fleet vehicle of the plurality of fleet vehicles, first data (including image data) of an operational surface on which the fleet vehicle is operated, the first data captured by a sensor associated with the fleet vehicle, determining, by the fleet vehicle using a neural network model trained for detection of operational surfaces associated with the plurality of fleet vehicles, a restricted mobility requirement or operational parameter for the fleet vehicle based, at least in part, on the first image data, and controlling an operation of the fleet vehicle based, at least in part, on the restricted mobility requirement or operational parameter.

According to some embodiments, a non-transitory machine-readable medium may include a plurality of machine-readable instructions which when executed by one or more processors are adapted to cause the one or more processors to perform a method. The method may include receiving, by a fleet vehicle of the plurality of fleet vehicles, first data of an operational surface on which the fleet vehicle is operated, the first data captured by a sensor associated with the fleet vehicle, determining, by the fleet vehicle using a neural network model trained for detection of operational surfaces associated with the plurality of fleet vehicles, a restricted mobility requirement or operational parameter for the fleet vehicle based, at least in part, on the first image data, and controlling an operation of the fleet vehicle based, at least in part, on the restricted mobility requirement or operational parameter.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

DETAILED DESCRIPTION

Figure 1:
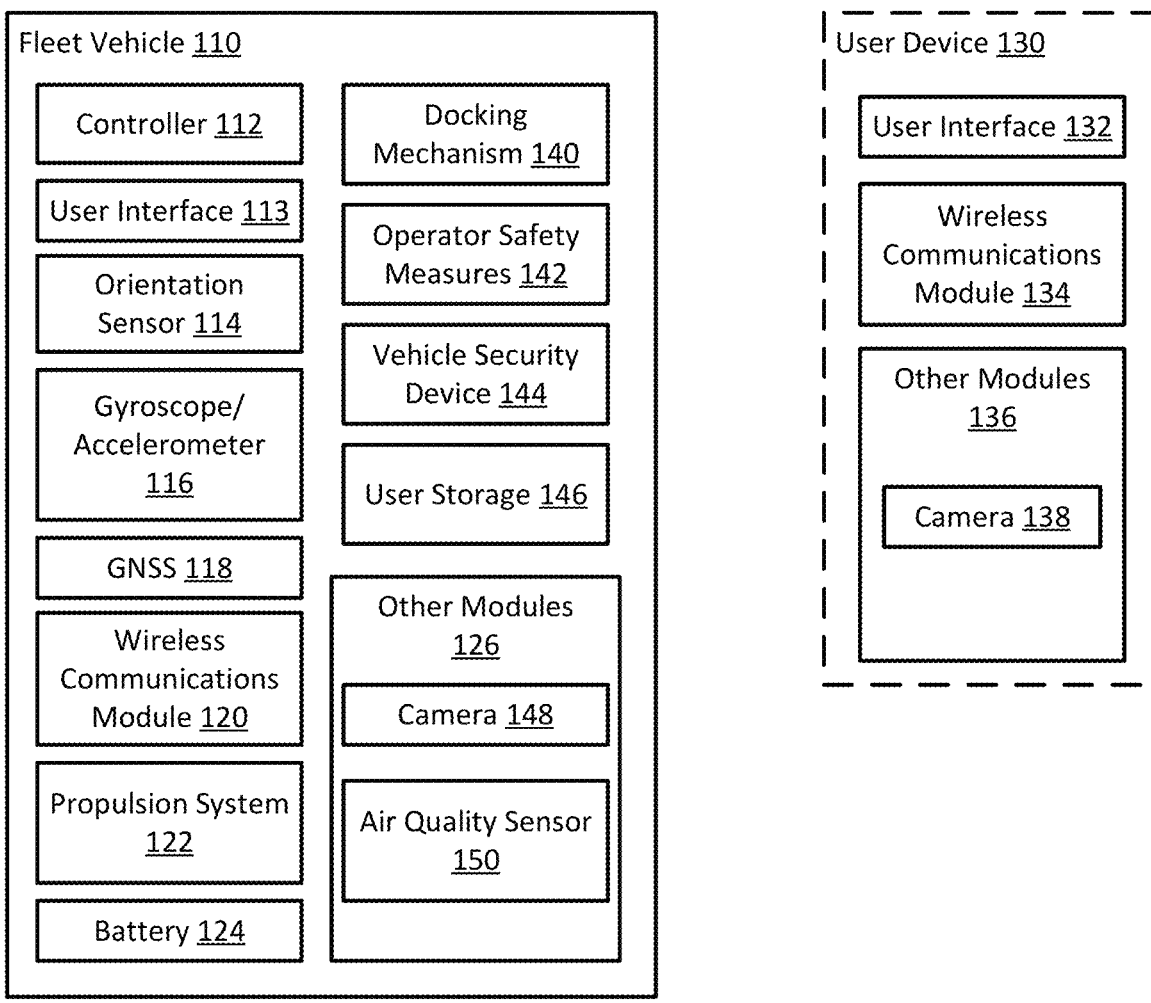
FIG. 1 illustrates a block diagram of a portion of a dynamic transportation matching system including a fleet vehicle in accordance with an embodiment of the disclosure.

In accordance with various embodiments of the present disclosure, surface detection and micro-mobility fleet vehicle control systems and methods provide a reliable and robust monitoring and control system to help in the management, operation, and use of fleet vehicles provided for hire by a fleet manager, such as a transportation services provider. For example, given a fleet of micro-mobility fleet vehicles managed by a service provider, a model for a neural network may be trained to identify certain operational surfaces on which the fleet vehicles may be driven, moved over, parked, or otherwise operated. These surfaces may include sidewalks, roads, particular driving lanes, streets, harbors, rivers, lakes, and other types of surfaces for operation of vehicles. These surfaces may also be utilized by other types of vehicles (e.g., cars, trucks, busses, water crafts, etc., including autonomous vehicles) and pedestrians. The surfaces may be associated with one or more restrictions, laws, regulations, or other operational requirements that limit the operating conditions and manner in which the micro-mobility fleet vehicles are operated. For example, fleet vehicles may be regulated based on certain regulatory and/or geospatial boundaries, locations, or areas. In some embodiments, the surfaces may be associated with parking, docking, or charging of the fleet vehicles or other vehicles. For example, with regard to fleet vehicles, a surface may correspond to a docking station or a soft docking station. A docking station may correspond to a location where a fleet vehicle may be left, rented, and/or charged by one or more users and/or a controller for the fleet vehicles. This may be a preset physical location, such as a visibly marked area or border or otherwise detectable by the fleet vehicle, and may have rules regarding how a vehicle is left, docked, and/or utilized (e.g., when driving to or leaving from the docking station). A soft docking station may correspond to a variable geo-location that may change or be established based on needs or requirements, such as a convention or crowd of users that may require use of the fleet vehicles. Soft docking stations may be identified through the fleet vehicle, such as through a display when the fleet vehicle is detected near or within the docking station. The fleet vehicle may also display nearby locations of soft docking stations, such that the user can navigate the vehicle to a desired soft docking station. Such locations may also have particular enforcement requirements for safety and the like. Once the neural network model (e.g., a surface detection model) is trained, it may be implemented on the fleet for the service provider. Thereafter, when a given fleet vehicle is being operated by a user, the operational surface that the fleet vehicle is operated on may be monitored to enforce those operational requirements specific for that surface. If the vehicle is being operated in a manner that violates the operational requirements or does not comply with an operational parameter for the surface, the mode and parameters of operation may be controlled and appropriate actions taken as needed.

In particular, to train a neural network model for use in surface detection for operational surfaces of fleet vehicles, initial training data may be required to be received by a neural network trainer for training a neural network. The training data may initially be captured by a micro-mobility fleet vehicle during a training route or path travelling through a location and may be updated as additional fleet vehicles operate within that location. For an initial model in a new location, such as a new city or county, the training data that is initially collected includes at least image data, including videos, still images, and/or environmental scans captured using a camera or other optical capture device of the fleet vehicle. The camera may be mounted on the fleet vehicle in a sensor package of the fleet vehicle, or the camera may be connectable to the fleet vehicle, such as a camera, mobile phone, or other device that can be connected to or used by a user operating the fleet vehicle during the travel route that captures the training data. The training data may further include additional sensor data or detectable data that may be captured using the sensor package. For example, the sensor package may be a camera-sensor fusion package that may includes one or more of a GPS locator or other global navigation satellite system (GNSS) transceiver, an accelerometer, an inertial measurement unit (IMU) detector, or other sensors. The sensors may each be capable of detecting properties of the operational surface of the fleet vehicle during the travel route, including images, properties, and location of the surfaces, such as streets, lanes, and sidewalks. Training data may also include other neural network models for different locations that may have previously been trained at other locations (e.g., neural network models for similar cities to a new city requiring a neural network model for surface detection within that new city). In this regard, one or more layers of the previous neural network models may be stripped away or removed to allow for re-training of those layers using the new image and/or sensor data, such as a first and/or last layer of those pre-trained models.

In various embodiments, the neural network model for the particular location may then be trained using the training data so as to allow determination and recognition of operational surfaces on which the fleet vehicles are operated. Training may be accomplished using a convolution neural network (CNN or ConvNet) architecture, such as one having four or more convolution networks, however, less convolution layers may also be used in some neural network models and training. CNNs are a type of deep neural networks whereby an input layer may be used to generate an output layer that allows specific classifications. In CNNs, weights and biases may be learned from input data or images so that importance or weights may be assigned to features within the images, thereby allowing classification of objects and other features within the images (e.g., an operational surface of a fleet vehicle when the fleet vehicle is operated). This may be done by proceeding over the input image to generate a convolution layer that extracts high level features of the input image. This may be done for multiple convolution layers until neurons of the neural network are trained and the neural network model is generated. Additional input data for the neural network may also include other training data that may affect the neural network so that the neural network can detect the operational surface of the fleet vehicle. For example, the other data may include sensor data captured by the sensor package (e.g., vibrational and/or movement data along the travel route), time of day, season, weather conditions, ambient or artificial lighting, acceleration parameters of the fleet vehicle, and/or crowd congestion models and parameters. For example, sidewalk detection through vibrational data or other data captured by one or more sensors (e.g., an accelerometer) is discussed in further detail in U.S. patent application Ser. No. 16/588,408, entitled "SYSTEMS AND METHODS FOR SIDEWALK DETECTION FOR PERSONAL MOBILITY VEHICLES," filed Sep. 30, 2019, which is hereby incorporated by reference in its entirety.

Once the neural network model is trained, the model may be distributed to the fleet of the micro-mobility fleet vehicles. The distribution may be from a cloud computing architecture and/or controller for the service provider and/or the fleet. Each fleet vehicle may receive or access the neural network model, which may occur when the fleet vehicle is connected through a wired or wireless connection to the controller including in real-time over a cellular network or any suitable communication network. The controller may also provide or enable access of the neural network model to users' mobile phones or other devices for distribution when a user's device connects to the fleet vehicle for renting, hiring, and/or operating. Once loaded to or accessed by the fleet vehicle, the neural network model may control usage and operation of the fleet vehicle. For example, the fleet vehicle may use the camera and/or other sensors accessible to the fleet vehicle to determine what type of surface the vehicle is being operated on through the neural network model. The surface may correspond to a surface that has an operational restriction or requirement, such as a law that restricts certain usage (e.g., a speed limit, a requirement for only a certain vehicle type, a bar of any vehicles, such as a sidewalk only for pedestrians, and the like). The surface may also correspond to a desired operational mode, such as if the surface is wet, slick, icy, rough, or other condition that is not a typical or normal condition of the surface. In this case, a desired speed limit may be lower than the posted or legal speed limit, such that the operational parameter may be to limit the speed, either by braking or other means, to a desired speed limit less than the legal speed limit. If the surface has a mobility restriction requirement (which may also include one or more operational parameters) for the fleet vehicle, a vehicle controller or other device may enforce the mobility restriction by engaging a resistor to slow the fleet vehicle or bring the fleet vehicle to a stop, notify the user of the mobility restriction or the unintended/unlawful use, and/or fine the user for the use that violates the mobility restriction or the operational parameter. Additionally, the sensor package of each fleet vehicle may continue to collect training data, which may be used to further train the neural network model and/or update the neural network model for higher precision and accuracy of surface detection.

FIG. 1 illustrates a block diagram of a portion of a dynamic transportation matching system (e.g., system 100) including a fleet vehicle 110 in accordance with an embodiment of the disclosure. In the embodiment shown in FIG. 1, system 100 includes fleet vehicle 110 and optional user device 130. In general, fleet vehicle 110 may be a passenger vehicle designed to transport a single user (e.g., a micro-mobility fleet vehicle) or a group of people (e.g., a typical car or truck). More specifically, fleet vehicle 110 may be implemented as a motorized or electric kick scooter, bicycle, and/or motor scooter designed to transport one or perhaps two people at once typically on a paved road (collectively, micro-mobility fleet vehicles), as a typical automobile configured to transport up to 4, 7, or 10 people at once, or according to a variety of different transportation modalities (e.g., transportation mechanisms). Fleet vehicles similar to fleet vehicle 110 may be owned, managed, and/or serviced primarily by a fleet manager/servicer providing fleet vehicle 110 for rental and use by the public as one or more types of transportation modalities offered by a dynamic transportation matching system, for example, or may be owned, managed, and/or serviced by a private owner using the dynamic transportation matching system to match their vehicle to a transportation request, such as with ridesharing or ridesourcing applications typically executed on a mobile user device, such as user device 130 as described herein. Optional user device 130 may be a smartphone, tablet, near field communication (NFC) or radio-frequency identification (RFID) enabled smart card, or other personal or portable computing and/or communication device that may be used to facilitate rental and/or operation of fleet vehicle 110.

As shown in FIG. 1, fleet vehicle 110 may include one or more of a controller 112, a user interface 113, an orientation sensor 114, a gyroscope/accelerometer 116, a global navigation satellite system receiver (GNSS) 118, a wireless communications module 120, a camera 148, a propulsion system 122, an air quality sensor 150, and other modules 126. Operation of fleet vehicle 110 may be substantially manual, autonomous, and/or partially or completely controlled by optional user device 130, which may include one or more of a user interface 132, a wireless communications module 134, a camera 138, and other modules 136. In other embodiments, fleet vehicle 110 may include any one or more of the elements of user device 130. In some embodiments, one or more of the elements of system 100 may be implemented in a combined housing or structure that can be coupled to or within fleet vehicle 110 and/or held or carried by a user of system 100.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of fleet vehicle 110 and/or other elements of system 100, for example. Such software instructions may also implement methods for processing images and/or other sensor signals or data, determining sensor information, providing user feedback (e.g., through user interface 113 or 132), querying devices for operational parameters, selecting operational parameters for devices, or performing any of the various operations described herein (e.g., operations performed by logic devices of various devices of system 100). Controller 112 may also be utilized to engage a slowing, braking, or operational function of fleet vehicle 110, for example, to slow or bring fleet vehicle to a stop or otherwise control movement of fleet vehicle 110 based on an operational surface of fleet vehicle 110.

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user via user interface 113 or 132. In some embodiments, controller 112 may be integrated with one or more other elements of fleet vehicle 110, for example, or distributed as multiple logic devices within fleet vehicle 110 and/or user device 130.

In some embodiments, controller 112 may be configured to substantially continuously monitor and/or store the status of and/or sensor data provided by one or more elements of fleet vehicle 110 and/or user device 130, such as the position and/or orientation of fleet vehicle 110 and/or user device 130, for example, and the status of a communication link established between fleet vehicle 110 and/or user device 130. Such communication links may be established and then provide for transmission of data between elements of system 100 substantially continuously throughout operation of system 100, where such data includes various types of sensor data, control parameters, and/or other data.

User interface 113 of fleet vehicle 110 may be implemented as one or more of a display, a touch screen, a keyboard, a mouse, a joystick, a knob, a steering wheel, a yoke, and/or any other device capable of accepting user input and/or providing feedback to a user. In various embodiments, user interface 113 may be adapted to provide user input (e.g., as a type of signal and/or sensor information transmitted by wireless communications module 134 of user device 130) to other devices of system 100, such as controller 112. User interface 113 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 113 may be adapted to display a time series of various sensor information and/or other parameters as part of or overlaid on a graph or map, which may be referenced to a position and/or orientation of fleet vehicle 110 and/or other elements of system 100. For example, user interface 113 may be adapted to display a time series of positions, headings, and/or orientations of fleet vehicle 110 and/or other elements of system 100 overlaid on a geographical map, which may include one or more graphs indicating a corresponding time series of actuator control signals, sensor information, and/or other sensor and/or control signals. In some embodiments, user interface 113 may be adapted to accept user input including a user-defined target heading, waypoint, route, and/or orientation, for example, and to generate control signals to cause fleet vehicle 110 to move according to the target heading, route, and/or orientation. In other embodiments, user interface 113 may be adapted to accept user input modifying a control loop parameter of controller 112, for example. In some embodiments, user interface 113 may also be used to display mobility restriction requirements and parameters of usage that violates those restrictions, including potential fines, excessive speed and/or speed limit, unlawful operation, operation on a restricted surface, and the like.

Orientation sensor 114 may be implemented as one or more of a compass, float, accelerometer, and/or other device capable of measuring an orientation of fleet vehicle 110 (e.g., magnitude and direction of roll, pitch, and/or yaw, relative to one or more reference orientations such as gravity and/or Magnetic North), camera 148, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of fleet vehicle 110 and/or other elements of system 100 and providing such measurements as sensor signals and/or data that may be communicated to other devices of system 100 (e.g., user interface 132, controller 112). In some embodiments, orientation sensor 114 and/or gyroscope/accelerometer 116 may include an IMU sensor configured to detect inertial readings and measurements for use in surface detection. In such embodiments, a sensor package may include the IMU sensor with orientation sensor 114 and/or gyroscope/accelerometer 116, where the IMU sensor may include a gyroscope, an accelerometer, and/or a magnetometer that implements the fusion algorithm and neural network model for sidewalk detection.

GNSS 118 may be implemented according to any global navigation satellite system, including a GPS, GLONASS, and/or Galileo based receiver and/or other device capable of determining absolute and/or relative position of fleet vehicle 110 (e.g., or an element of fleet vehicle 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS 118 may include an altimeter, for example, or may be used to provide an absolute altitude.

Wireless communications module 120 may be implemented as any wireless communications module configured to transmit and receive analog and/or digital signals between elements of system 100. For example, wireless communications module 120 may be configured to receive control signals and/or data from user device 130 and provide them to controller 112 and/or propulsion system 122. In other embodiments, wireless communications module 120 may be configured to receive images and/or other sensor information (e.g., still images or video images) and relay the sensor data to controller 112 and/or user device 130. In some embodiments, wireless communications module 120 may be configured to support spread spectrum transmissions, for example, and/or multiple simultaneous communications channels between elements of system 100. Wireless communication links formed by wireless communications module 120 may include one or more analog and/or digital radio communication links, such as WiFi, Bluetooth, NFC, RFID, and others, as described herein, and may be direct communication links established between elements of system 100, for example, or may be relayed through one or more wireless relay stations configured to receive and retransmit wireless communications. In various embodiments, wireless communications module 120 may be configured to support wireless mesh networking, as described herein. In various embodiments, wireless communications module 120 may be configured to support receiving neural network models for surface detection and updating those models, as described herein.

In some embodiments, wireless communications module 120 may be configured to be physically coupled to fleet vehicle 110 and to monitor the status of a communication link established between fleet vehicle 110 and/or user device 130. Such status information may be provided to controller 112, for example, or transmitted to other elements of system 100 for monitoring, storage, or further processing, as described herein. In addition, wireless communications module 120 may be configured to determine a range to another device, such as based on time of flight, and provide such range to the other device and/or controller 112. Communication links established by wireless communication module 120 may be configured to transmit data between elements of system 100 substantially continuously throughout operation of system 100, where such data includes various types of sensor data, control parameters, and/or other data, as described herein.

Propulsion system 122 may be implemented as one or more motor-based propulsion systems, and/or other types of propulsion systems that can be used to provide motive force to fleet vehicle 110 and/or to steer fleet vehicle 110. In some embodiments, propulsion system 122 may include elements that can be controlled (e.g., by controller 112 and/or user interface 113) to provide motion for fleet vehicle 110 and to provide an orientation for fleet vehicle 110. In various embodiments, propulsion system 122 may be implemented with a portable power supply, such as a battery and/or a combustion engine/generator and fuel supply.

For example, in some embodiments, such as when propulsion system 122 is implemented by an electric motor (e.g., as with many micro-mobility fleet vehicles), fleet vehicle 110 may include battery 124. Battery 124 may be implemented by one or more battery cells (e.g., lithium ion battery cells) and be configured to provide electrical power to propulsion system 122 to propel fleet vehicle 110, for example, as well as to various other elements of system 100, including controller 112, user interface 113, and/or wireless communications module 120. In some embodiments, battery 123 124 may be implemented with its own safety measures, such as thermal interlocks and a fire-resistant enclosure, for example, and may include one or more logic devices, sensors, and/or a display to monitor and provide visual feedback of a charge status of battery 124 (e.g., a charge percentage, a low charge indicator, etc.).

Other modules 126 may include other and/or additional sensors, actuators, communications modules/nodes, and/or user interface devices, for example, and may be used to provide additional environmental information related to operation of fleet vehicle 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), and/or other environmental sensors providing measurements and/or other sensor signals that can be displayed to a user and/or used by other devices of system 100 (e.g., controller 112) to provide operational control of fleet vehicle 110 and/or system 100. In further embodiments, other modules 126 may include a light, such as a headlight or indicator light, and/or an audible alarm, both of which may be activated to alert passersby to possible theft, abandonment, and/or other critical statuses of fleet vehicle 110. In particular, and as shown in FIG. 1, other modules 126 may include camera 148 and/or air quality sensor 150. In some embodiments, other modules 126 may include the IMU sensor configured to detect inertial readings and measurements for use in surface detection when not provided as part of or incorporated with orientation sensor 114, gyroscope/accelerometer 116.

Camera 148 may be implemented as an imaging device including an imaging module including an array of detector elements that can be arranged in a focal plane array. In various embodiments, camera 148 may include one or more logic devices (e.g., similar to controller 112) that can be configured to process imagery captured by detector elements of camera 148 before providing the imagery to wireless communications module 120. More generally, camera 148 may be configured to perform any of the operations or methods described herein, at least in part, or in combination with controller 112 and/or user interface 113 or 132. These operations may include or be associated with surface detection to limit or control fleet vehicle 110 based on operational surfaces on which fleet vehicle 110 is operated.

In various embodiments, air quality sensor 150 may be implemented as an air sampling sensor configured to determine an air quality of an environment about fleet vehicle 110 and provide corresponding air quality sensor data. Air quality sensor data provided by air quality sensor 150 may include particulate count, methane content, ozone content, and/or other air quality sensor data associated with common street level sensitivities and/or health monitoring typical when in a street level environment, such as that experienced when riding on a typical micro-mobility fleet vehicle, as described herein.

Fleet vehicles implemented as micro-mobility fleet vehicles may include a variety of additional features designed to facilitate fleet management and user and environmental safety. For example, as shown in FIG. 1, fleet vehicle 110 may include one or more of docking mechanism 140, operator safety measures 142, vehicle security device 144, and/or user storage 146, as described in more detail herein by reference to FIGS. 3A-C.

User interface 132 of user device 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by wireless communications module 134 of user device 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of fleet vehicle 110 and/or other elements of system 100. For example, user interface 132 may be adapted to display a time series of positions, headings, and/or orientations of fleet vehicle 110 and/or other elements of system 100 overlaid on a geographical map, which may include one or more graphs indicating a corresponding time series of actuator control signals, sensor information, and/or other sensor and/or control signals. In some embodiments, user interface 132 may be adapted to accept user input including a user-defined target heading, waypoint, route, and/or orientation, for example, and to generate control signals to cause fleet vehicle 110 to move according to the target heading, route, and/or orientation. In other embodiments, user interface 132 may be adapted to accept user input modifying a control loop parameter of controller 112, for example.

Wireless communications module 134 may be implemented as any wireless communications module configured to transmit and receive analog and/or digital signals between elements of system 100. For example, wireless communications module 134 may be configured to transmit control signals from user interface 132 to wireless communications module 120 or 144. In some embodiments, wireless communications module 134 may be configured to support spread spectrum transmissions, for example, and/or multiple simultaneous communications channels between elements of system 100. In various embodiments, wireless communications module 134 may be configured to monitor the status of a communication link established between user device 130 and/or fleet vehicle 110 (e.g., including packet loss of transmitted and received data between elements of system 100, such as with digital communication links), and/or determine a range to another device, as described herein. Such status information may be provided to user interface 132, for example, or transmitted to other elements of system 100 for monitoring, storage, or further processing, as described herein. In various embodiments, wireless communications module 134 may be configured to support wireless mesh networking, as described herein.

Other modules 136 of user device 130 may include other and/or additional sensors, actuators, communications modules/nodes, and/or user interface devices used to provide additional environmental information associated with user device 130, for example. In some embodiments, other modules 136 may include a humidity sensor, a wind and/or water temperature sensor, a barometer, a radar system, a visible spectrum camera, an infrared camera, a GNSS receiver, and/or other environmental sensors providing measurements and/or other sensor signals that can be displayed to a user and/or used by other devices of system 100 (e.g., controller 112) to provide operational control of fleet vehicle 110 and/or system 100 or to process sensor data to compensate for environmental conditions. In some embodiments, other modules 136 may include an IMU sensor configured to detect inertial readings and measurements for use in surface detection. As shown in FIG. 1, other modules 136 may include camera 138.

Camera 138 may be implemented as an imaging device including an imaging module including an array of detector elements that can be arranged in a focal plane array. In various embodiments, camera 138 may include one or more logic devices (e.g., similar to controller 112) that can be configured to process imagery captured by detector elements of camera 138 before providing the imagery to wireless communications module 120. More generally, camera 138 may be configured to perform any of the operations or methods described herein, at least in part, or in combination with controller 112 and/or user interface 113 or 132. These operations may include or be associated with surface detection to limit or control fleet vehicle 110 based on operational surfaces on which fleet vehicle 110 is operated.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 and/or elements of other systems similar to system 100 using a variety of wired and/or wireless communication techniques, including voltage signaling, Ethernet, WiFi, Bluetooth, Zigbee, Xbee, Micronet, Near-field Communication (NFC) or other medium and/or short range wired and/or wireless networking protocols and/or implementations, for example. In such embodiments, each element of system 100 may include one or more modules supporting wired, wireless, and/or a combination of wired and wireless communication techniques, including wireless mesh networking techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for fleet vehicle 110, using one or more power leads. Such power leads may also be used to support one or more communication techniques between elements of system 100.

Figure 2:
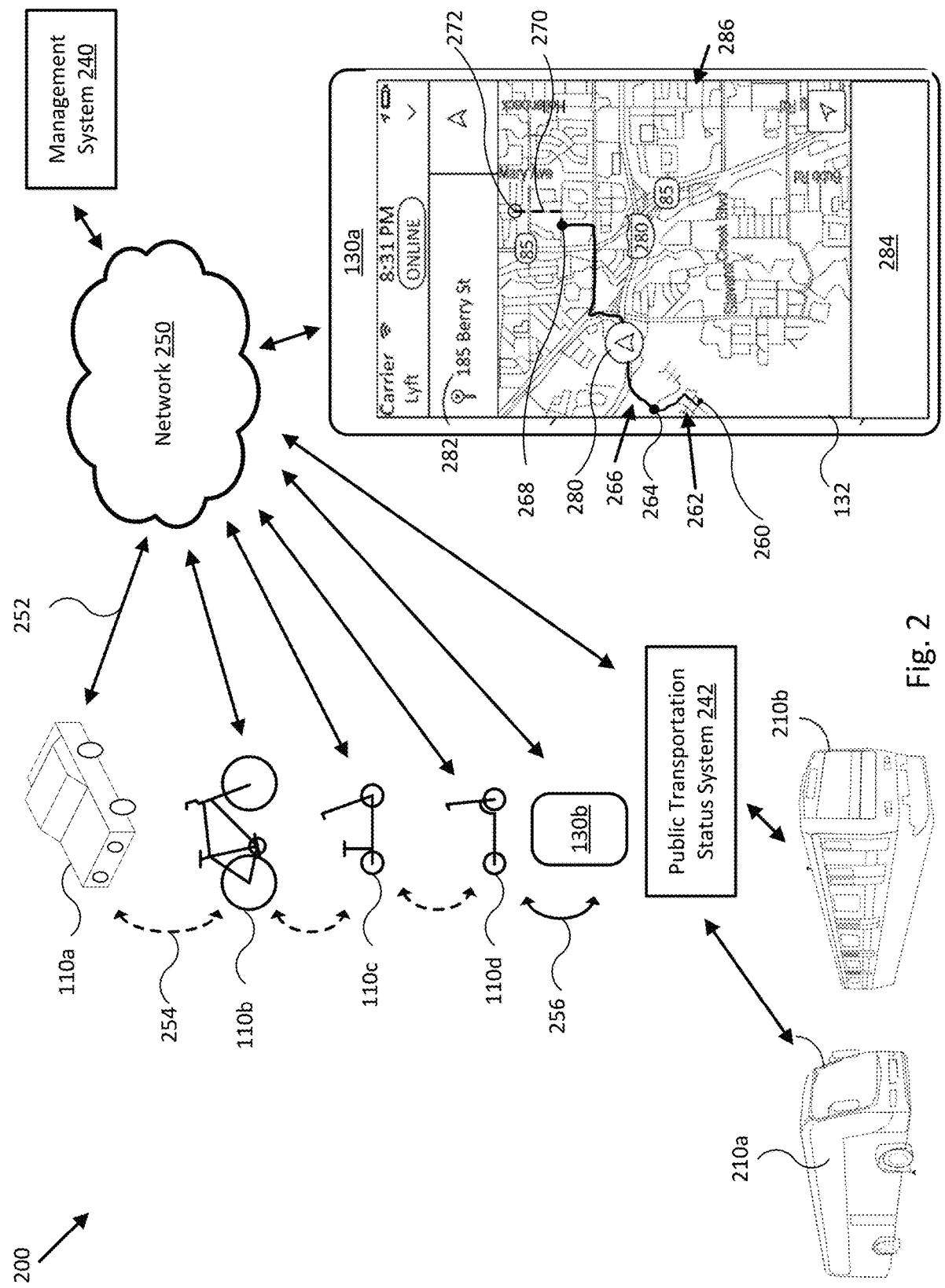
FIG. 2 illustrates a block diagram of a dynamic transportation matching system incorporating a variety of transportation modalities in accordance with an embodiment of the disclosure.

FIG. 2 illustrates a block diagram of dynamic transportation matching system 200 incorporating a variety of transportation modalities in accordance with an embodiment of the disclosure. For example, as shown in FIG. 2, dynamic transportation matching system 200 may include multiple embodiments of system 100. In the embodiment shown in FIG. 2, dynamic transportation matching system 200 includes management system/server 240 in communication with a number of fleet vehicles 110a-d and user devices 130a-b over a combination of a typical wide area network (WAN) 250, WAN communication links 252 (solid lines), a variety of mesh network communication links 254 (curved dashed lines), and NFC, RFID, and/or other local communication links 256 (curved solid lines). Dynamic transportation matching system 200 also includes public transportation status system 242 in communication with a variety of public transportation vehicles, including one or more buses 210a, trains 210b, and/or other public transportation modalities, such as ships, ferries, light rail, subways, streetcars, trolleys, cable cars, monorails, tramways, and aircraft. As shown in FIG. 2, all fleet vehicles are able to communicate directly to WAN 250 and, in some embodiments, may be able to communicate across mesh network communication links 254, to convey fleet data and/or fleet status data amongst themselves and/or to and from management system 240.

In FIG. 2, a requestor may use user device 130 *a* to hire or rent one of fleet vehicles 110 *a-d* by transmitting a transportation request to management system 240 over WAN 250, allowing management system 240 to poll status of fleet vehicles 110 *a-d* and to select one of fleet vehicles 110 *a-d* to fulfill the transportation request; receiving a fulfillment notice from management system 240 and/or from the selected fleet vehicle, and receiving navigation instructions to proceed to or otherwise meet with the selected fleet vehicle. A similar process may be used by a requestor using user device 130 b, but where the requestor is able to enable a fleet vehicle over local communication link 263 256, as shown. Moreover, WAN 250 may be used convey image and/or sensor data and/or to and from management system 240, as well as receive and update neural network models based on the data. Each fleet vehicle 110 a-d includes an embodiment of system 100 configured to be operated and monitor operations of fleet vehicles 110 a-d using a neural network model trained for surface detection. In particular, FIG. 2 displays transmissions and receipts of data necessary to train, distribute, and update the neural network model based, at least in part, on image data and other sensor data captured by fleet vehicles 110 a-d.

Management system 240 may be implemented as a server with controllers, user interfaces, communications modules, and/or other elements similar to those described with respect to system 100 of FIG. 1, but with sufficient processing and storage resources to manage operation of dynamic transportation matching system 200, including monitoring statuses of fleet vehicles 110a-d, as described herein. In some embodiments, management system 240 may be implemented in a distributed fashion and include multiple separate server embodiments linked communicatively to each other direction and/or through WAN 250. WAN 250 may include one or more of the Internet, a cellular network, and/or other wired or wireless WANs. WAN communication links 252 may be wired or wireless WAN communication links, and mesh network communication links 254 may be wireless communication links between and among fleet vehicles 110a-d, as described herein.

User device 130a in FIG. 2 includes a display of user interface 132 that shows a planned route for a user attempting to travel from origination point 260 to destination 272 using different transportation modalities (e.g., a planned multimodal route), as depicted in route/street map 286 rendered by user interface 132. For example, management system 240 may be configured to monitor statuses of all available transportation modalities (e.g., including fleet vehicles and public transportation vehicles) and provide a planned multimodal route from origination point 260 to destination 272. Such planned multimodal route may include, for example, walking route 262 from origination point 260 to bus stop 264, bus route 266 from bus stop 264 to bus stop 268, and micro-mobility route 270 (e.g., using one of micro-mobility fleet vehicles 110b, 110c, or 110d) from bus stop 268 to destination 272. Also shown rendered by user interface 132 are present location indicator 280 (indicating a present absolute position of user device 130a on street map 486), navigation destination selector/indicator 282 (e.g., configured to allow a user to input a desired navigation destination), and notice window 284 (e.g., used to render fleet status data, including user notices and/or alerts, as described herein). For example, a user may use navigation destination selector/indicator 282 to provide and/or change destination 272, as well as change any leg or modality of the multimodal route from origination point 260 to destination 272. In some embodiments, notice window 284 may display instructions for traveling to a next waypoint along the determined multimodal route (e.g., directions to walk to a bus stop, directions to ride a micro-mobility fleet vehicle to a next stop along the route, etc.).

In various embodiments, management system 240 may be configured to provide or suggest an optimal multimodal route to a user (e.g., initially and/or while traversing a particular planned route), and a user may select or make changes to such route through manipulation of user device 130a, as shown. For example, management system 240 may be configured to suggest a quickest route, a least expensive route, a most convenient route (to minimize modality changes or physical actions a user must take along the route), an inclement weather route (e.g., that keeps the user protected from inclement weather a maximum amount of time during route traversal), or some combination of those that is determined as best suited to the user, such as based on various user preferences. Such preferences may be based on prior use of system 200, prior user trips, a desired arrival time and/or departure time (e.g., based on user input or obtained through a user calendar or other data source), or specifically input or set by a user for the specific route, for example, or in general. In one example, origination point 260 may be extremely congested or otherwise hard to access by a ride-share fleet vehicle, which could prevent or significantly increase a wait time for the user and a total trip time to arrive at destination 272. In such circumstances, a planned multimodal route may include directing the user to walk and/or take a scooter/bike to an intermediate and less congested location to meet a reserved ride-share vehicle, which would allow the user to arrive at destination 272 quicker than if the ride-share vehicle was forced to meet the user at origination point 260. It will be appreciated that numerous different transportation-relevant conditions may exist or dynamically appear or disappear along a planned route that may make it beneficial to use different modes of transportation to arrive at destination 272 efficiently, including changes in traffic congestion and/or other transportation-relevant conditions that occur mid-route, such as an accident along the planned route. Under such circumstances, management system 240 may be configured to adjust a modality or portion of the planned route dynamically in order to avoid or otherwise compensate for the changed conditions while the route is being traversed.

Figure 3A:
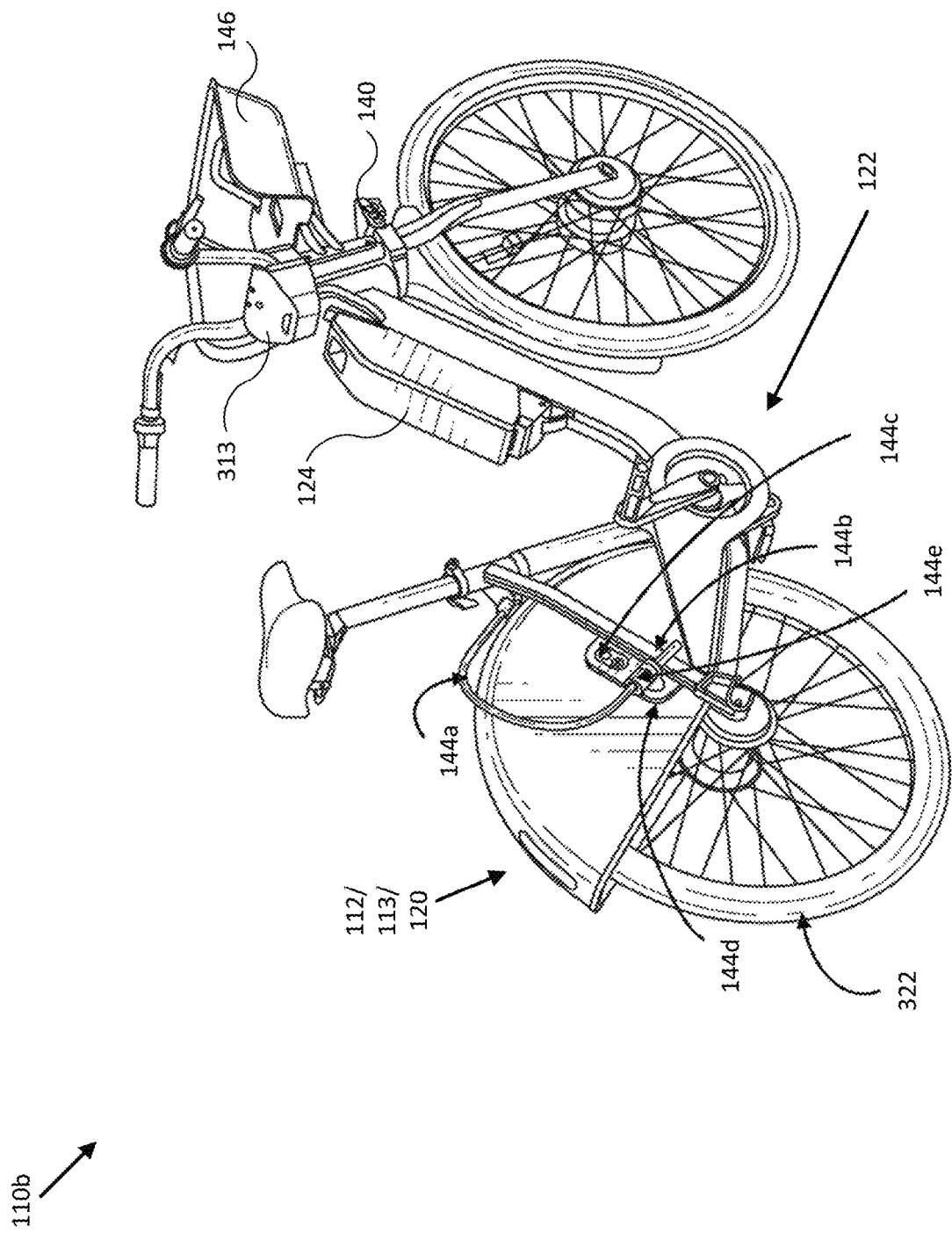
FIGS. 3A-C illustrate diagrams of micro-mobility fleet vehicles for use in a dynamic transportation matching system in accordance with embodiments of the disclosure.
Figure 3B:
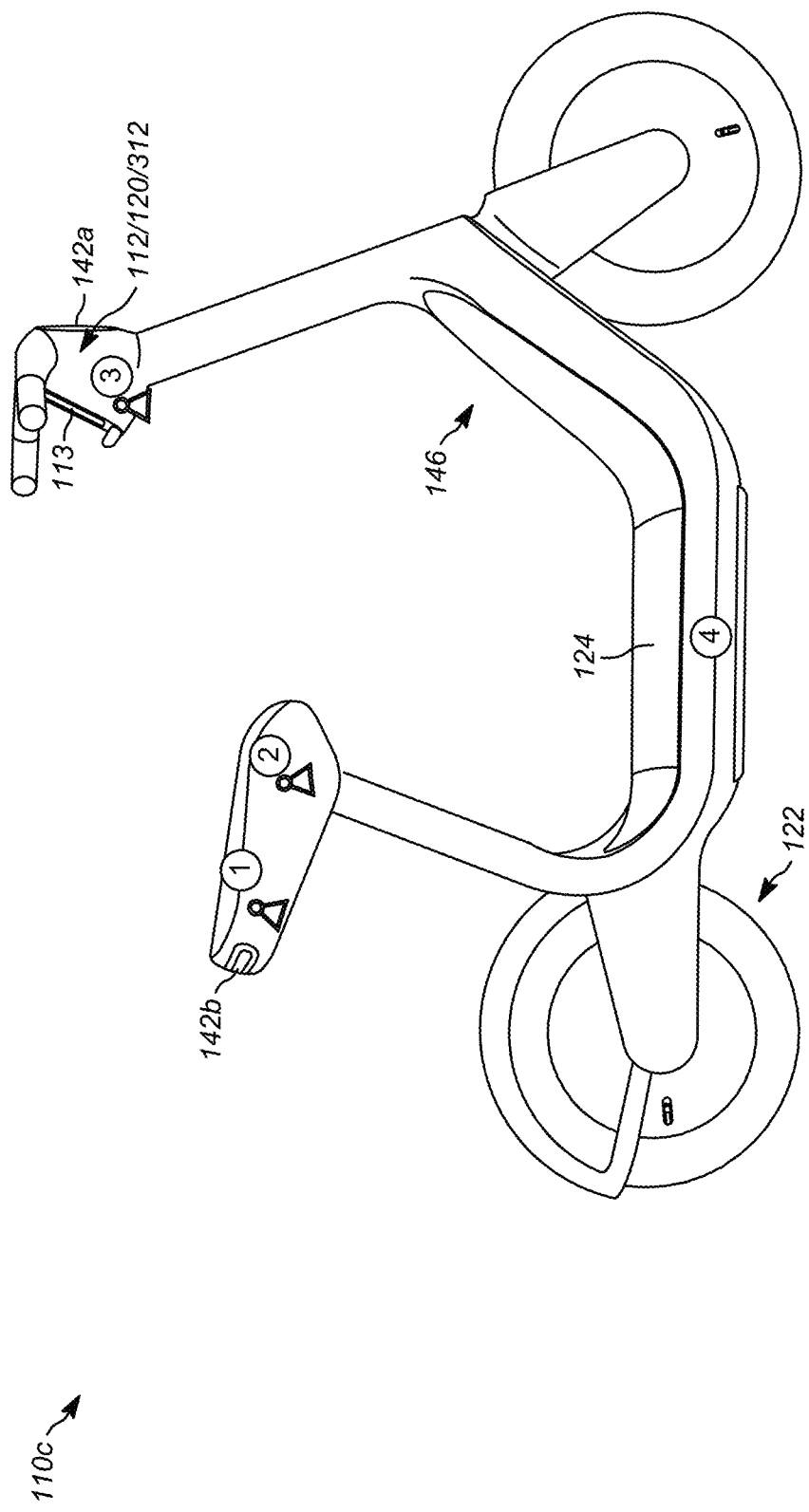
Figure 3C:
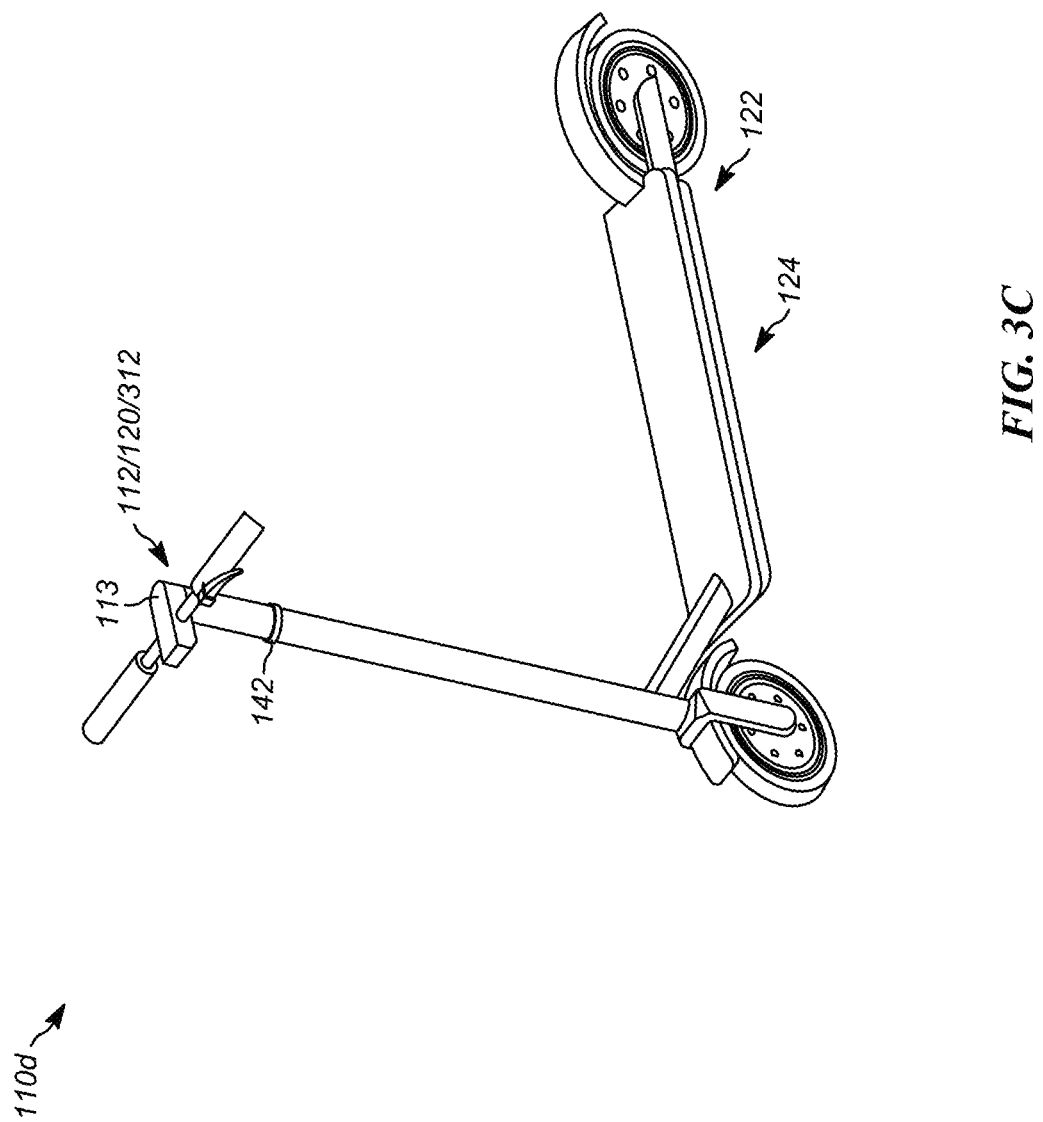

FIGS. 3A-C illustrate diagrams of micro-mobility fleet vehicles 110b, 110c, and 110d, which may be integrated with mobile mesh network provisioning systems in accordance with an embodiment of the disclosure. For example, fleet vehicle 110b of FIG. 3A may correspond to a motorized bicycle for hire that is integrated with the various elements of system 100 and may be configured to participate in dynamic transportation matching system 200 of FIG. 2 and may be configured to detect surfaces and control operations based on operational surfaces. As shown, fleet vehicle 110b includes controller/user interface/wireless communications module 112/113/120 (e.g., integrated with a rear fender of fleet vehicle 110b), propulsion system 122 configured to provide motive power to at least one of the wheels (e.g., a rear wheel 322) of fleet vehicle 110b, battery 124 for powering propulsion system 122 and/or other elements of fleet vehicle 110b, docking mechanism 140 (e.g., a spade lock assembly) for docking fleet vehicle 110b at a docking station, user storage 146 implemented as a handlebar basket, and vehicle security device (e.g., an embodiment of vehicle security device 144 of FIG. 1), which may incorporate one or more of a locking cable 144a, a pin 144b coupled to a free end of locking cable 144a, a pin latch/insertion point 144c, a frame mount 144d, and a cable/pin holster 144e, as shown (collectively, vehicle security device 144). In some embodiments, controller/user interface/wireless communications module 112/113/120 may alternatively be integrated on and/or within a handlebar enclosure 313, as shown.

In some embodiments, vehicle security device 144 may be implemented as a wheel lock configured to immobilizing rear wheel 322 of fleet vehicle 110*b*, such as by engaging pin 144*b* with spokes of rear wheel 322. In the embodiment shown in FIG. 3A, vehicle security device 144 may be implemented as a cable lock configured to engage with a pin latch on a docking station, for example, or to wrap around and/or through a secure pole, fence, or bicycle rack and engage with pin latch 144*c*. In various embodiments, vehicle security device 144 may be configured to immobilize fleet vehicle 110*b* by default, thereby requiring a user to transmit a hire request to management system 240 (e.g., via user device 130) to hire fleet vehicle 110*b* before attempting to use fleet vehicle 110*b*. The hire request may identify fleet vehicle 110*b* based on an identifier (e.g., a QR code, a barcode, a serial number, etc.) presented on fleet vehicle 110*b* (e.g., such as by user interface 113 on a rear fender of fleet vehicle 110*b*). Once the hire request is approved (e.g., payment is processed), management system 240 may transmit an unlock signal to fleet vehicle 110*b* (e.g., via WAN/network 250). Upon receiving the unlock signal, fleet vehicle 110*b* (e.g., controller 112 of fleet vehicle 110*b*) may release vehicle security device 144 and unlock rear wheel 322 of fleet vehicle 110*b*.

Fleet vehicle 110*c* of FIG. 3B may correspond to a motorized sit-scooter for hire that is integrated with the various elements of system 100 and may be configured to participate in dynamic transportation matching system 200 of FIG. 2 and may be configured to detect surfaces and control operations based on operational surfaces. As shown in FIG. 3B, fleet vehicle 110*c* includes many of the same elements as those discussed with respect to fleet vehicle 110*b* of FIG. 3A. For example, fleet vehicle 110*c* may include user interface 113, propulsion system 122, battery 124, controller/wireless communications module/cockpit enclosure 112/120/312, user storage 146 (e.g., implemented as a storage recess), and operator safety measures 142*a* and 142*b*, which may be implemented as various types of headlights, programmable light strips, and/or reflective strips.

Figure 4:
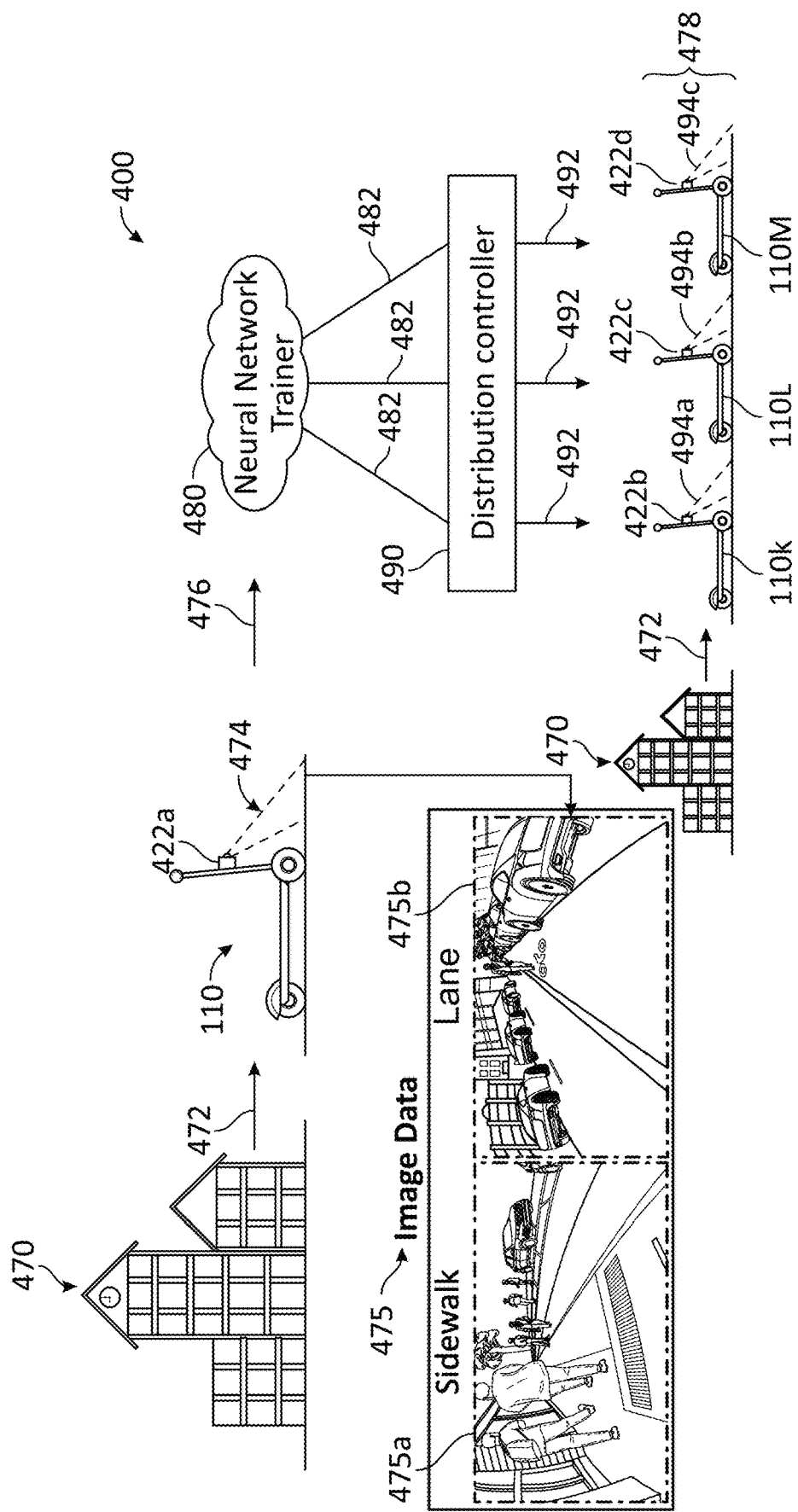
FIG. 4 illustrates a system environment where a neural network model is trained using image and other sensor data at a location, which is used for operational monitoring and control of micro-mobility fleet vehicles in accordance with an embodiment of the disclosure.

Fleet vehicle 110*d* of FIG. 3C may correspond to a motorized stand or kick scooter for hire that is integrated with the various elements of system 100 and may be configured to participate in dynamic transportation matching system 200 of FIG. 2 and may be configured to detect surfaces and control operations based on operational surfaces. As shown in FIG. 3C, fleet vehicle 110*d* includes many of the same elements as those discussed with respect to fleet vehicle 110*b* of FIG. 3A. For example, fleet vehicle 110*d* may include user interface 113, propulsion system 122, battery 124, controller/wireless communications module/cockpit enclosure 112/120/312, and operator safety measures, which may be implemented as various types programmable light strips and/or reflective strips, as shown. Moreover, fleet vehicles 110*b*-*d* may be configured to report image data, sensor data, and/or operational data (e.g., detected surfaces of operation for micro-mobility fleet vehicles 110*c*, 110*e*, and/or 110*g*) for use in enforcing restricted mobility requirements or otherwise controlling operation of the fleet vehicle in response to detected surface data, as well as possibly surrounding or environmental data FIG. 4 illustrates a system environment where a neural network model is trained using image and other sensor data at a location, which is used for operational monitoring and control of other micro-mobility fleet vehicles in accordance with an embodiment of the disclosure. In the embodiment shown in FIG. 4, an environment 400 is shown where a neural network model is trained, distributed, and utilized for surface detection during operation of micro-mobility fleet vehicles.

In this regard, environment 400 includes a location 470, such as a city, county, or other area where a fleet of micro-mobility fleet vehicles may be utilized, which may include roads, lanes, and sidewalks specific to pedestrians, certain vehicles, and the like due to local laws, regulations and licensing, and/or safety issues. In order to map images and/or video of location 470 to train a neural network model in surface detection, identification, and/or classification, a training route 472 may be executed by a fleet vehicle 110. Training route 472 may correspond to a timed travel route through a sufficient amount or distance of location 470 to generate training data to first train the neural network model. This may be dependent on the complexity and differences between operational surfaces within location 470 (e.g., if the location has fairly uniform or consistent surfaces (smooth flat roads, for example), less training will be needed as compared with surfaces that show wide variation within the location (wide smooth flat roads to bumpy narrow streets), whether other neural network models for other locations may be utilized to also train the neural network model for location 470, and other factors.

A camera-sensor fusion module 422*a* may be used to capture training data 474 of the operational surfaces within location 470. Camera-sensor fusion module 422*a* may include at least a camera or other optical capture device that can image the operational surfaces of location 470. For example, camera-sensor fusion modules 422*a*-*d* may include camera 138 provided by user device 130 or camera 148 provided by fleet vehicle 110. The camera may therefore capture images and/or video, which may be processed to determine a neural network model for surface detection. Other capture devices may also be used to provide a more accurate representation of the surface, such as radar/lidar systems, infrared system (to detect heat signatures), and audio systems (to determine roughness of the road as the vehicle travels across). This camera or other capture device may therefore capture a field of view of an operational surface when camera-sensor fusion modules 422*a*-*d* capture image or video data.

Camera-sensor fusion module 422 *a* may also include a GPS module, an IMU module, an accelerometer, a gyroscope, and/or other sensors that may assist in detecting surfaces through various sensor inputs. For example, camera-sensor fusion modules 422 *a*-*d* may include orientation sensor 114, gyroscope/accelerometer 116, and/or other modules 126 when provided by fleet vehicle 110. However, camera-sensor fusion modules 422 *a*-*d* may also include components provided by user device 130 where user device 130 is used for operational surface detection, including other modules 136. In this regard, an accelerometer or gyroscope may be capable of detecting certain bumps, physical patterns, or other patterns, materials, or objects that constitute the surface. A sidewalk with a pattern of indented lines, for example, through placement of different sidewalk material blocks, may be detected through vibrations of fleet vehicle 110 and/or camera-sensor fusion module 422 *a*. Movement data may also be used to detect movement to and/or from a lane or sidewalk, and may be combined with other data (e.g., a GPS location) to determine an operational surface of location 470. Thus, training data 474 may include image data with additional sensor data captured of location 470 during training route 472. A sample of training data 474 is shown as image data 475. Image data 475 shows two different captured images during training route 472 that shows different operational surfaces of location 470. For example, a sidewalk 475 *a* is shown on the left, which captures an image of a sidewalk used for operation of fleet vehicle 110. In contrast, a lane 475 *b* (e.g., a road or bike lane, or "no sidewalk") is shown on the right that corresponds to other operational surfaces of location 470.

Once training data 474 is generated, the data is transmitted to a neural network trainer 480 during training operations 476. Training operations 476 may stream, upload, or otherwise provide training data 474 to neural network trainer 480 for generation of the neural network module using a convolution neural network. A convolution neural network (CNN) takes, as input, one or more training images, applies filters (e.g., kernels) over the image to generate convolution layers, where the filters may correspond to weights or other functions applied over the input image and/or successive neural network layer. Between successive convolution layers or sets of convolution layers, a pooling layer is further provided that may assist in reducing the dimensions of the data in the convolution layers, for example, by reducing clusters of neurons at the convolution layer to single neurons at the pooling layer. After the last layer (dependent on number of convolution/pooling layers or other architecture of the particular CNN), a fully connected layer may be determined that allows for classification of input images or data into specific categories. For example, this may allow for a car, a boat, a bike, etc., for vehicle classification designation, or, with regard to operational surfaces of micromobility fleet vehicles, sidewalk or no sidewalk, vehicle lane or sidewalk, or other classifications associated with roads, streets, vehicle and/or pedestrian lanes, sidewalks, crosswalks, and the like.

Thus, using a CNN, a neural network model may be trained to classify operational surfaces as "sidewalk" or "no sidewalk." Other classifications may also be generated depending on the requirements for location 470, such as "bike lane," "road," or "parking lot." A fusion algorithm may also be utilized to combine camera detection of operational surfaces (e.g., using the trained CNN with camera 138 or camera 148) with one or more other operational surface detection processes, such as IMU detection and/or vibrational detection (e.g., using orientation sensor 114, gyroscope/accelerometer 116, other modules 126 and/or other modules 136) For example, an fusion algorithm for camera-sensor fusion modules 422*a-d* may correspond naive deterministic approach using the individual model detection probabilities pFused(sidewalk)=(pIMU(sidewalk)+pCV(sidewalk))/2 where IMU is the inertial measurement unit and CV is the camera vision (e.g., field of view). Another machine learning approach where camera image data and IMU data is captured simultaneously is to have both algorithms or models run in parallel and train a fusion model as such: pFused(sidewalk)=Model (pIMU, pCV, latitude, longitude, time of day, etc.). This fusion algorithm therefore provides different weights and combinations to the inertial measurement unit detection and the camera vision from camera-sensor fusion modules 422*a-d* so that multiple input types may be used for operational surface detection. Thus, the fusion model and algorithm may utilize signals from the camera (e.g., images or video within a field of view), signals from the accelerometer (e.g., vibrations or other movement), signals from a GPS locator (e.g., latitude, longitude, or other coordinate) and/or other signals from sensors. The fusion algorithm further provides logic to the controller of the corresponding fleet vehicle to switch between different detection models and states. For example, camera detection of operational surfaces may be utilized where accelerometer data is not being captured or does not indicate a particular surface. Conversely, camera-sensor fusion modules 422*a-d* may be switched to detect accelerometer data for operational surfaces where the camera may be obstructed by pedestrians, vehicles, or other objects. This allows for intelligent switching of detection modes, sensors, and models.

Once the neural network model is generated for location 470 using at least training data 474, as well a further use additional data such as other trained neural networks and/or additional non-image data (e.g., locations, vibrational/movement data, time of day, season, accelerations, etc.), the neural network model may be distributed to a distribution controller 490 through transmissions 482. Distribution controller 490 may correspond to various types of infrastructure and/or devices that may provide or access of the neural network model to the fleet vehicles of a location-based fleet 478 for location 470, where the fleet vehicles may then be operated using the neural network model for surface detection. For example, distribution controller 490 may correspond to charging stations or pods that charge the fleet vehicles, but may also correspond to user mobile devices that connect with fleet vehicles k-m for renting or hiring, as well as other devices that may load data to the fleet vehicles. In some embodiments, the fleet vehicles may include cellular, Wi-Fi, or other wireless connectivity where transmissions 482 and transmissions 292 492 correspond to single direct transmissions to the fleet vehicles.

Thereafter, location-based fleet 478 may be hired and/or rented by users within location 470 so that the fleet vehicles may be operated on surfaces of location 470. During operation of the fleet vehicles, operational data 494*a-c* may be captured by camera-sensor fusion modules 422*b-d* of the fleet vehicles (e.g., corresponding to camera-fusion module 422*a*), which may include at least camera or image data. This may further include other sensor data, such as movement, location, or vibrational data captured by camera-sensor fusion modules 422*b-d*. When capturing operational data 494*a-c*, the neural network module may be used to classify whether the fleet vehicles are being operated on allowable or restricted surfaces, such as those surfaces having a restricted mobility status or requirement (e.g., speed limit, ban on operation of certain vehicles, etc.). In this regard, fleet vehicle 110*k* may be operated on a sidewalk, which may be detected through operational data 494*a* and detected/classified using the neural network model. If fleet vehicle 110*k* is banned from operating on a sidewalk, or is restricted to 5 MPH, then the neural network model and a controller (e.g., controller 112) may be used to engage a resistor, brake, or other mechanism of fleet vehicle 110*k* to slow fleet vehicle 110*k* and/or bring fleet vehicle 110*k* to a stop. Fleet vehicle 110*k* may also output a notification (e.g., speed limit and/or current speed of fleet vehicle 110*k*, as well as a color-coded light or notice) and/or may provide operational data 494*a* to the user or another service provider to warn the user, fine the user, and/or take another adverse action against the user (e.g., banning the user's account, increasing rates to the user for using the a fleet vehicle within the system, or flagging for review). Thus, fleet vehicle 110*k* may be controlled based on the restricted mobility requirement for the current operation surface of fleet vehicle 110*k*.

Conversely, if fleet vehicle 110*l* is operated on a valid surface, such as "no sidewalk" or a "road" as classified based on operational data 494*b* and the neural network model, the controller of fleet vehicle 110*l* may not take an action to change operations or notify the user. The controller may output a positive notification associated with the valid surface, such as a green light or other indication that fleet vehicle 110*l* is being operated in conformity with the requirements of location 470. Additionally, image and/or other sensor data (e.g., operational data 494*a-c*) during operation of location-based fleet 478 may be provided back to neural network trainer 480 to revise weights, classifications, and/or layers of the neural network model for further training and updating of the neural network model, thereby increasing accuracy of classifications in image data. Similarly, fleet vehicle 110*m* may be operated on a sidewalk or other restricted mobility requirement surface but may be operated in conformity with such rules based on operational data 494*c* so that an action is not taken with fleet vehicle 110*m*.

Figure 5:
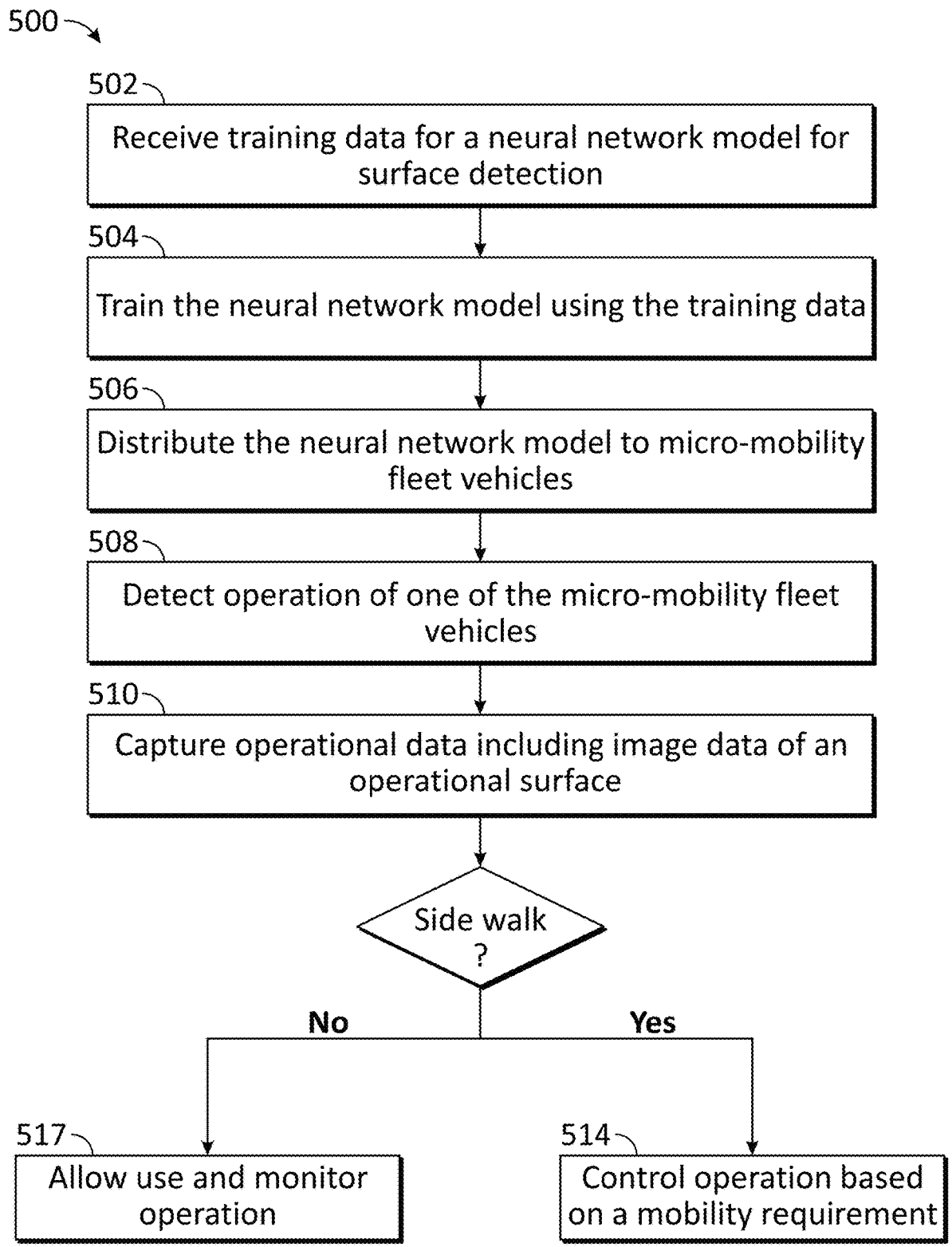
FIG. 5 illustrates a flow diagram of a process for camera-sensor fusion module trained to detect surfaces and control a fleet vehicle's operation in accordance with an embodiment of the disclosure.

FIG. 5 illustrates a flow diagram of a process 500 for camera-sensor fusion module trained to detect surfaces and control a fleet vehicle's operation in accordance with an embodiment of the disclosure. It should be appreciated that any step, sub-step, sub-process, or block of process 500 may be performed in an order or arrangement different from the embodiments illustrated by FIG. 5. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 500 is described with reference to systems, processes, control loops, and images described in reference to FIGS. 1-4, process 500 may be performed by other systems different from those systems, processes, control loops, and images and including a different selection of electronic devices, sensors, assemblies, mobile structures, and/or mobile structure attributes, for example.

In block 502 of process 500, training data is received for a neural network model for surface detection. For example, controller 112 and/or user device 130 may be configured to capture, record, or otherwise determine at least camera and image data of operational surfaces for fleet vehicles during a training route through a location. In some embodiments, controller 112 and/or user device 130 may be configured to capture other sensor data, including movement, acceleration, and/or vibrational data through an accelerometer and/or gyroscope, inertial motion data through an IMU detector, location data through a GPS module, acceleration and/or other data. The training route may correspond to a travel route of fleet vehicle 110 through the location that requires mapping and detection of operational surfaces, where the training data may be generated using one or more of orientation sensor 114, gyroscope/accelerometer 116, GNSS 118, camera 148, and/or other modules 126 when captured by controller 112. Where user device 130 is utilized during operation of fleet vehicle 110 on the training route, other modules 136 and/or camera 138 may be used. Thereafter, controller 112 and/or user device 130 provides the training data to a neural network trainer for a model used for surface detection, such as neural network trainer 480.

In block 504, the neural network model is trained using the training data. For example, neural network trainer 480 may utilize a CNN or other neural network to train a model utilized by imaging devices and processors to classify surfaces and provide surface detection of a type or class of operational surface on which fleet vehicles 110*a-m* are operated. Where the training data corresponds to video data, still image or frame samples may be taken at specific time intervals or the frames of the video data may be utilized for image data processing. Additionally, for surface classification, a balanced data set may be required having certain percentages of images and/or video of the different surfaces for classification. The data may be prelabeled for certain surface classes for data processing and classification. Additionally, environmental and/or conditional information may be used, or the training data may be captured in certain conditions so as to provide easier labeling and classification of the data.

Neural network trainer 480 may the convolve the initial image data input to determine one or more convolution layers, as required by the specific neural network architecture. This may involve running filters, weights, or other functions over areas of the image pixels to generate further layers, where each layer includes a feature map corresponds to neurons of the neural network model determined from the previous layer. Further, a fully connected layer may be generated to perform classification from input images. In some embodiments, the neural network model may be trained using one or more previous neural network models for other locations, where one or more layers may be removed and retrained using input training data from the current location. Thus, certain layers are retrained while keeping certain layers from the other locations for faster model generation and training. For example, the first and/or last layer(s) of a neural network model trained for surface detection at a different location may be removed from that trained model and retrained using new image data from the new location.

In block 506, the neural network model is distributed to the micro-mobility fleet vehicles. Neural network trainer 480 may utilize distribution controller 490 to distribute the neural network model to fleet vehicles 110*a-m*, such as through charging stations or pods that directly connect to fleet vehicles 110*a-m* and provide charging, maintenance, updates, and/or the neural network model to fleet vehicles 110*a-m*. In some embodiments, distribution controller 490 may also interact with user device 130, such as a mobile phone, to distribute the neural network model to one or more of fleet vehicles 110*a-m*. This may occur when fleet vehicles 110*a-m* are rented or hired by user device 130, within a proximity to user device 130, or otherwise interact with user device 130. Neural network trainer 480 may also or instead use WAN 250 to directly transmit the neural network model to fleet vehicles (e.g., over a cellular network where fleet vehicles 110*a-m* include cellular communication modules with wireless communications module 120).

In block 508, operation of one of the micro-mobility fleet vehicles is detected. For example, controller 112 and/or user device 130 may be configured to detect a renting or hiring of fleet vehicle 110, which may be linked to a user, an account of the user, and/or device of the user. In this regard, user device 130 may be used to rent or hire fleet vehicle 110 by interacting with fleet vehicle 110, which may use an account or payment instrument associated with user device 130. In some embodiments, a more conventional payment instrument may also be used to hire or rent fleet vehicle 110, such as input of a credit or debit card, which allows linking to a certain user and/or account. The operation of fleet vehicle 110 may also include movement of fleet vehicle 110 over or on a surface, such as driving a micro-mobility fleet vehicle on a street, road, lane, or sidewalk.

In block 510, operational data including, at least, image data of an operational surface is captured. This operational data includes images or video of the operational surface on which fleet vehicle 110 is operated and may be captured using controller 112 and/or user device 130. In some embodiments, the operational data may further include additional sensor data captured from one or more components of fleet vehicle 110 and/or user device 130. This additional sensor data may be associated with the data that the neural network model is trained to detect for surface detection and classification, including movement, location, vibrational, and/or inertial data. The image data for the operational data may include images, such as frames or image samples from video data, or periodically captured images. Using the operational data, the neural network model is applied to classify the current operational surface of fleet vehicle 110 using one of controller 112 or user device 130.

For example, image data may be processed by the neural network model to classify the surface detected in the image data, such as images captured of the surface while fleet vehicle 110 is in operation, moving, or being parked. In this regard, different operational surface may have different rules, such as a ban on powered scooters or bikes on sidewalks, a speed limit, a required parking area or surface (e.g., no sidewalks) for rentable fleet vehicles, and the like. Thus, the neural network model may perform classification on the operational surface to determine whether a corrective action to control fleet vehicle 110 is required. Classification may be done by determining an output class of the particular surface within the captured operational data. Based on the classification of the current operational surface of fleet vehicle 110, process 500 may proceed to either block 517 or block 514.

In block 517, the use is allowed, and operation is monitored. This may occur where the neural network model classifies the operational surface as one without restricted mobility statuses or requirements and the current operation of fleet vehicle 110 complies with any other restricted mobility requirements. For example, where fleet vehicle 110 is authorized to drive on areas not classified as sidewalks (e.g., roads, specific lanes, or other street routes), then the current operation of fleet vehicle 110 may be allowed and not impeded. Thus, a "no sidewalk" classification may allow use of fleet vehicle 110 on the surface. Moreover, continued operation of fleet vehicle 110 is monitored, for example, by capturing further image data, in order to detect whether fleet vehicle 110 moves to a surface having one or more restricted mobility requirement.

However, if the operational surface is instead classified as a sidewalk or one having restricted mobility statuses or requirements for the micro-mobility fleet vehicle, then in block 514, operation of the micro-mobility fleet vehicle is controlled based on the mobility requirement. For example, controller 112 and/or user device 130 may be configured to control fleet vehicle 110 according to the classified operational surface and one or more restricted mobility requirements for the operational surface. In some embodiments, controller 112 and/or user device 130 may be configured to control fleet vehicle 110 according to the restricted mobility requirement and/to or communicate the user notice to a user of fleet vehicle 110 via user interface 113 and/or 134. For example, the fleet vehicle directive may include a motor halt directive and/or an audible alarm directive, and controller 112 and/or user device 130 may be configured to control a propulsion system to impede motion of wheels of fleet vehicle 110, flash a light, or sound an audible alarm integrated with fleet vehicle 110.

More generally, the restricted mobility requirement may include any directive causing fleet vehicle 110 to enable or disable or otherwise operate an element of system 100 in FIG. 1. Additionally, fleet vehicle 110 may also be allowed to operate on sidewalks, but only under certain conditions, such as at a 5 MPH maximum, in certain areas of a city, or at certain times due to laws, safety practices or regulations, or other restrictions. Thus, if the surface is classified as "sidewalk," controller 112 and/or user device 130 may also check for restricted mobility requirements and confirm that the operation of fleet vehicle 110 is being properly operated. Thus, controlling operation of fleet vehicle 110 may also include checking for compliance with restricted mobility requirements and monitoring compliance based on the detected operational surface as classified by the neural network model based on the operational data. Moreover, if the operation of fleet vehicle 110 violates the restricted mobility requirements for the operational surface, one or more penalties may be imposed on the user of fleet vehicle 110. The account of the user of fleet vehicle 110 may be fined or billed for the misuse of fleet vehicle 110 and the user may be warned. Alternatively, the user's account may be flagged or banned from further renting one or more of fleet vehicles 110 a-m. Further, an authoritative entity may be informed of the location, misuse, or other information of fleet vehicle 110 that violates the restricted mobility requirement(s) to impose further penalties.

Figure 6:
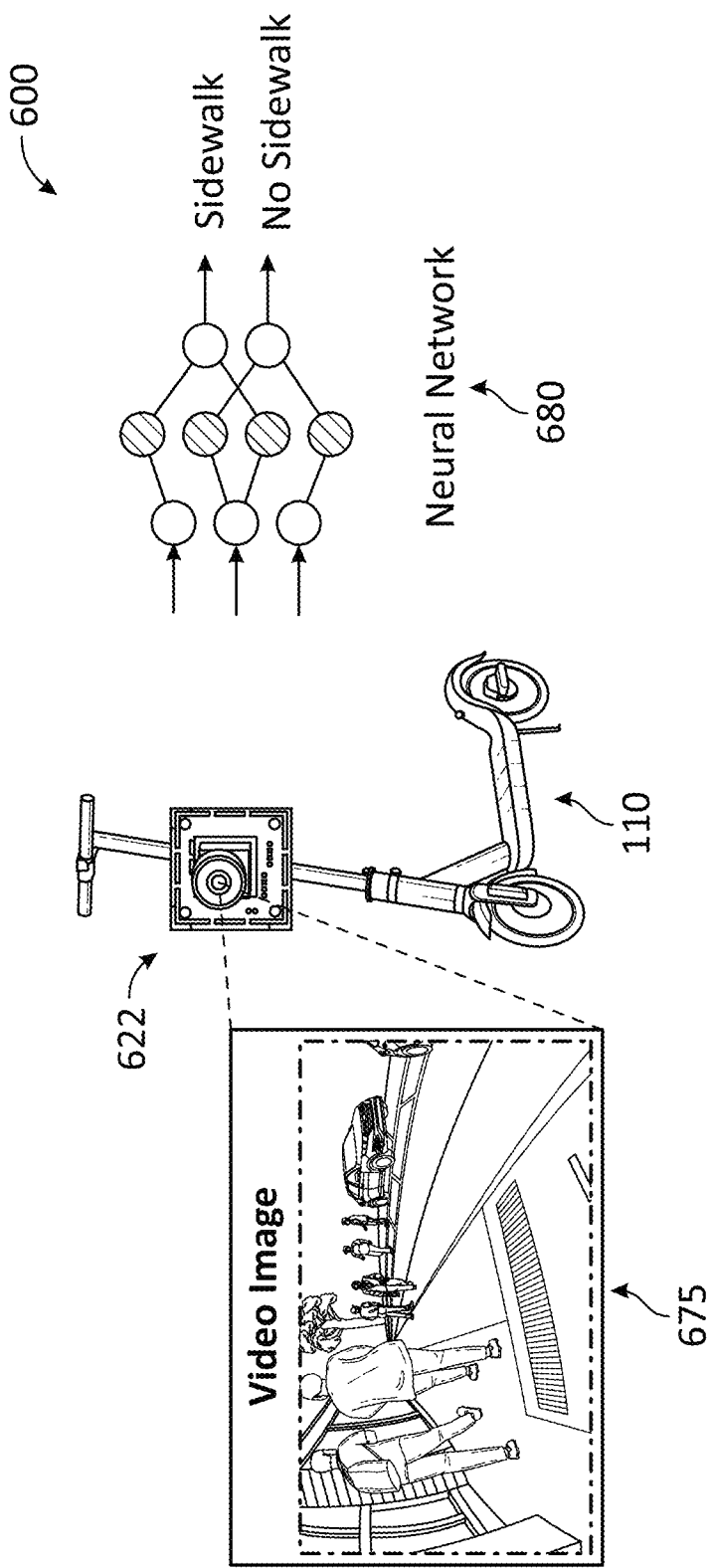
FIG. 6 illustrates a system environment for training a fusion neural network model for operational surface detection.

FIG. 6 illustrates a system environment for training a fusion neural network model for operational surface detection. In environment 600, fleet vehicle 110 operates within a location, such as a city, where fleet vehicle 110 captures or records image data and other sensor data (e.g., accelerometer data, inertial data, or other data captured by a fusion sensor module or package). The data may then be used to train a neural network model for detection of different types or operational surfaces on which fleet vehicle 110 may be operated.

For example, during operation of fleet vehicle 110 on a training route, video image 675 may be captured using camera-sensor fusion module 622. Additional data may also be captured using camera-sensor fusion module 622, such as movement data, geo-location (e.g., GPS data), accelerometer data and/or vibrational data captured using an accelerometer or gyroscope, and/or internal measurements. This data may be utilized to train a neural network 680. For example, neural network 680 illustrates an example neural network that may be used to implement surface detection during operation of fleet vehicle 110. As shown, the neural network includes three layers—an input layer, a hidden layer, and an output layer having one or more nodes, however, different layers may also be utilized. For example, although only one hidden layer is shown, neural network 680 may include as many hidden layers as necessary or appropriate.

These nodes are connected to nodes in an adjacent layer. In this example, neural network 680 receives a set of input values and produces one or more output values, for example, in the case of sidewalk detection, "sidewalk" or "no sidewalk." However, different, more, or less outputs may also be provided based on the training. When neural network 680 is used to, each node in the input layer may correspond to a distinct attribute or input data type derived from the training data collected by camera-sensor fusion module 622. In a non-limiting example, the input nodes may include image data, accelerometer data, and/or inertial measurements.

In some embodiments, each of the nodes in the hidden layer generates a representation, which may include a mathematical computation (or algorithm) that produces a value based on the input values of the input nodes. The mathematical computation may include assigning different weights to each of the data values received from the input nodes. The hidden layer nodes may include different algorithms and/or different weights assigned to the input data and may therefore produce a different value based on the input values. The values generated by the hidden layer nodes may be used by the output layer node to produce an output value for neural network 680. When neural network 680 is used to implement operational surface detection, the output values produced by neural network 680 may indicate a likelihood that an operational surface on which fleet vehicle 110 is operated corresponds to a sidewalk, no sidewalk, a road, a street, a specific lane (e.g., a bike lane, scooter lane, or the like), or other type of surface, such as a parking lot.

The neural network 680 may be trained by using training data, including video image 675. By providing training data to neural network 680, the nodes in the hidden layer may be trained (adjusted) such that an optimal output (e.g., a classification) is produced in the output layer based on the training data. By continuously providing different sets of training data and penalizing neural network 680 when the output of neural network 680 is incorrect (e.g., when the correct operational surface is not determined or output by neural network 680), neural network 680 (and specifically, the representations of the nodes in the hidden layer) may be trained (adjusted) to improve its performance in data classification. Adjusting the neural network 680 may include adjusting the weights associated with each node in the hidden layer.

Figure 7:
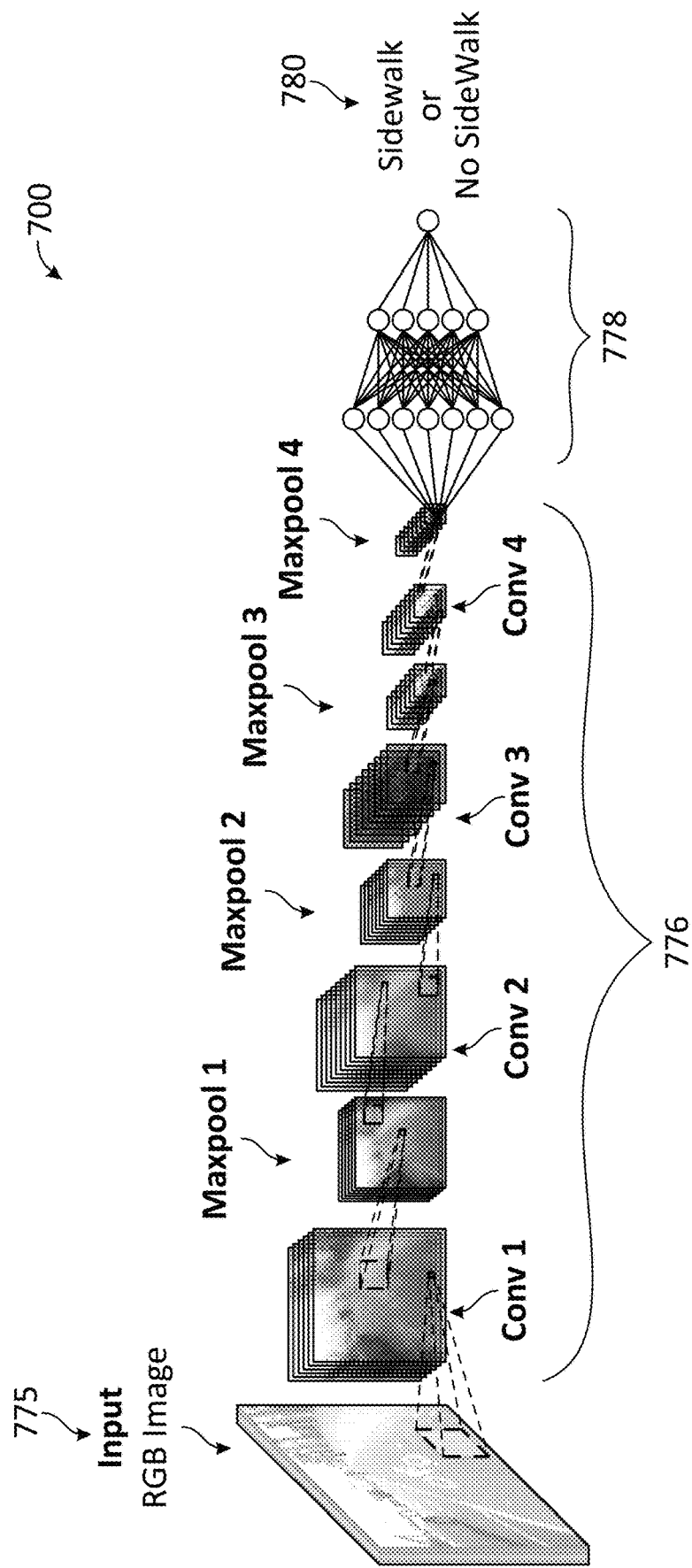
FIG. 7 illustrates a convolution neural network model used for operational surface detection.

FIG. 7 illustrates a convolution neural network model used for operational surface detection. Convolution neural network (CNN) 700 in FIG. 7 shows an exemplary design of a CNN that may be used to train and utilize a neural network model for sidewalk detection, or detection of other operational surfaces on which a micro-mobility fleet vehicle may be operated. For example, an output classification 780 may be provided by CNN 700 based on input data 775, such as an image or video of an operational surface on which the micro-mobility fleet vehicle is operated on, parked on, or otherwise utilized with that surface.

CNN 700 may be based on a neural network architecture having four convolution layers (e.g., Conv 1-4). These four layers may be extended, or less layers may be used in different types of neural network models and training. As such, CNN 700 may have more or less layers as necessary for certain classifications and accuracy. In CNN 700, feature learning 776 includes the convolution layers that are determined for feature learning, and further include a max pooling layer between each convolution layer. A convolution layer of feature learning 776 is determined from input data 775 (or other convolution and/or pooling layer) by applying a filter or kernel corresponding to some weights, thereby allowing nearby input pixels or neurons to be connected to nearby output neurons that reduce the size and/or dimensionality of input data 775. This allows for extraction of the high-level features from input data 775. In some embodiments, additional operations may be performed, for example, based on the size and/or number of pixels in the input images and/or number of strides of pixel shifts when applying the filter over the input layer or the next convolution/pooling layer. Strides may allow for reduction of the output layer when applying a filter or kernel over the input image or layer. Image padding allows for addition of further pixel values (e.g., 0) to an image or instead to drop off edge pixels, which accounts for cases where the image size does not match the filter size. For example, it may be desirable to ensure that each pixel, including edge pixels, are adequately weighted by each filter. A Rectified Linear Unit (ReLU) operation may also be applied to prevent negative values in the convolution layer or otherwise introduce non-linearity.

A pooling layer (e.g., one of Maxpool 1-4, although more or less Maxpools may be utilized) may correspond to a Max pooling function where a cluster of neurons (e.g., values from the convolution layer in the matrix) is reduced to the highest value for the cluster. Thus, a filter is applied over the layer to reduce the dimensionality of the feature map of the convolution layer (e.g., Conv 1 or another layer) in the pooling layer (e.g., Maxpool 1). Sum pooling or Average pooling may instead be used. These processes for determining convolution layers and pooling layers provide the feature learning for the CNN based on the input image(s) and/or other data. Once the final pooling layer is generated within feature learning 776, a fully connected layer for classifications 778 of objects or features by the CNN is determined. These objects or features may correspond to the operational surface for a micro-mobility fleet vehicle. A flattening operation may convert the feature map matrix of the last layer into a single column or vector that is then input to the neural network for model training with backpropagation applied to the training A Softmax function may also be applied to the fully connected layer to allow for probabilistic classifications 778. This allows for generation of a neural network model that can classify objects and/or images by identifying features within the input images, and there provide output classification 778.

Figure 8:
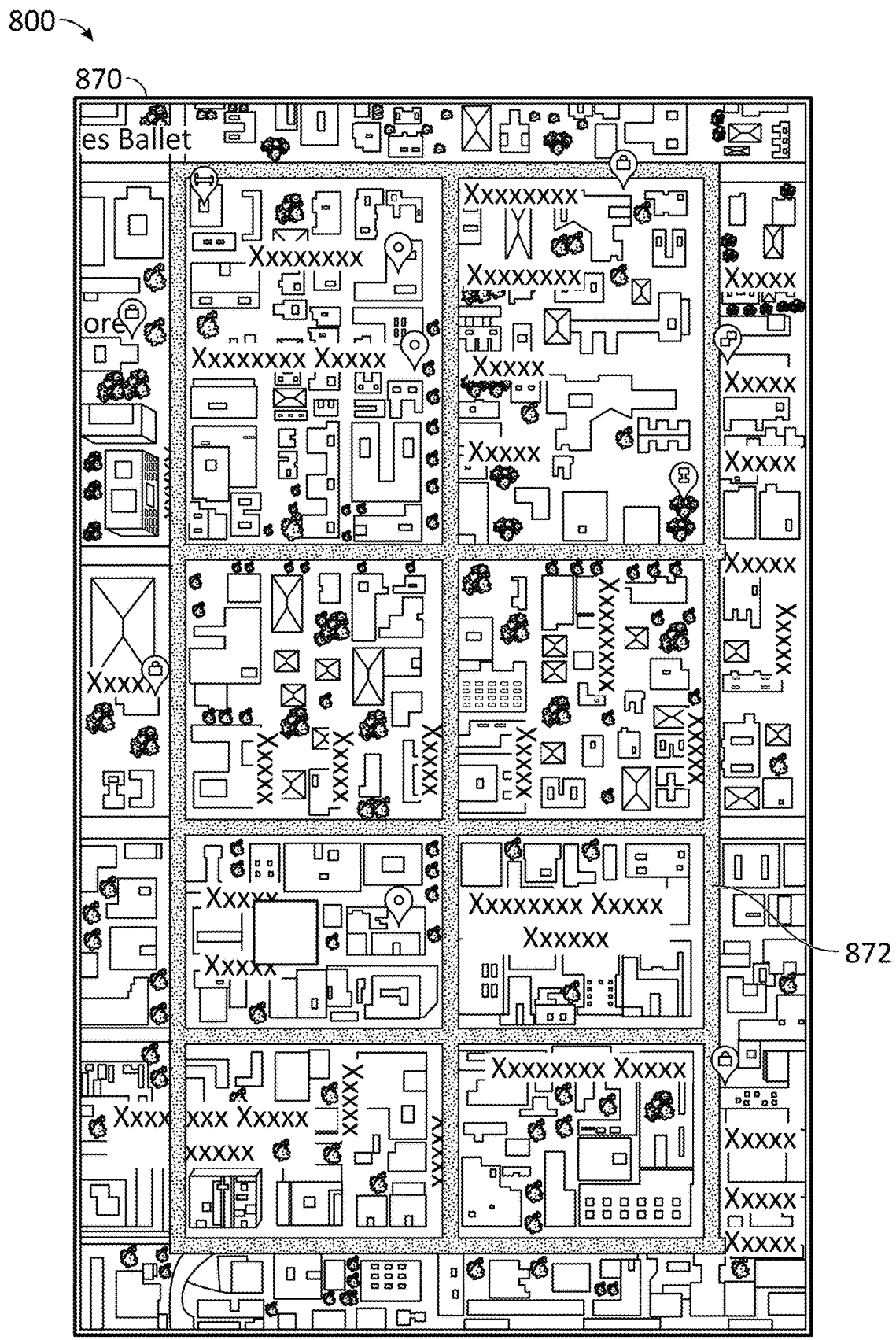
FIG. 8 illustrates a system environment where a micro-mobility fleet vehicle may operate on a training route for training a neural network model for operational surface detection.

FIG. 8 illustrates a system environment where a micro-mobility fleet vehicle may operate on a training route for training a neural network model for operational surface detection. For example, a micro-mobility fleet vehicle, such as fleet vehicle 110 may be operated along a training route 872 through a location 870, where training route 872 is utilized for the collection of training data. This training data may include data captured by a camera-sensor fusion module that includes sensors, such as a camera or other visual capture device, an accelerometer or gyroscope, a vibrational detection sensor, an IMU sensor, and/or another sensor utilized with a neural network model for operational surface detection.

For example, training route 872 may correspond to a ride of a micro-mobility fleet vehicle through location 870, such as a 15-minute ride of a scooter or bike having the camera-sensor fusion module. Video or images of the training data may be captured of operational surfaces (e.g., sidewalks, streets, and the like) of location 870 using a camera of camera-sensor fusion module. Video may be converted to one or more images, such as by extracting video frames every 0.5 seconds or at another interface. Moreover, in order to receive balanced data, a balanced data set of the operational surfaces may be captured during training route 872 (e.g., 50% sidewalk and 50% no sidewalk images). The data may also be prelabeled so that a particular video corresponds to a particular output class or classification (e.g., the video corresponds to "sidewalk" images used to train the neural network model). In order to provide the training, the conditions during capture of the video may be important for training route 872. For example, the conditions may require marking bike lanes or other surfaces in a particular color, having lighting above a certain brightness threshold, and/or having appropriate weather (e.g., non-rainy, non-snowy, freezing temperatures, and any other measurable weather condition).

Figure 9A:
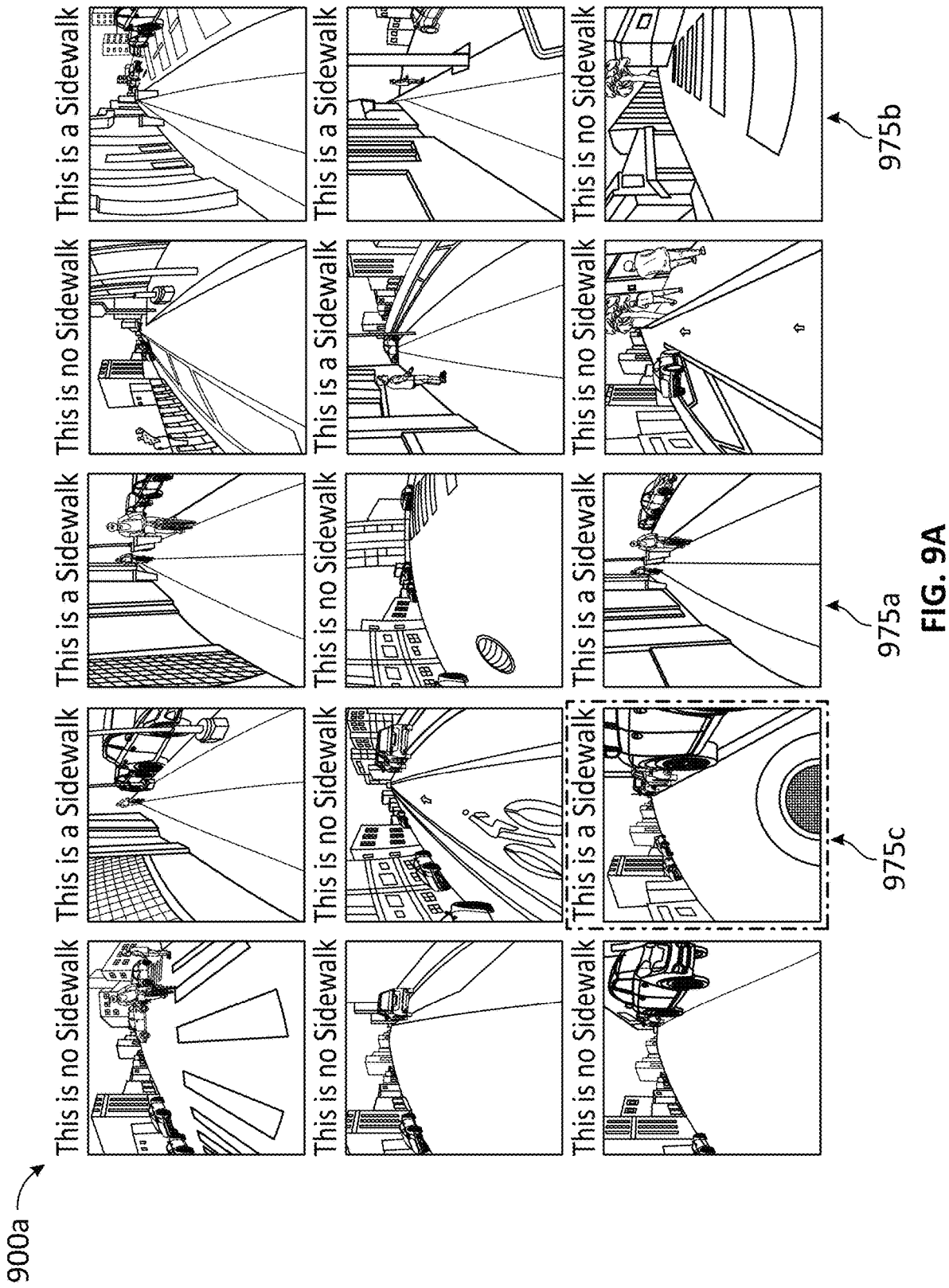
FIGS. 9A-B illustrate classification results for a neural network model trained for operational surface detection.
Figure 9B:
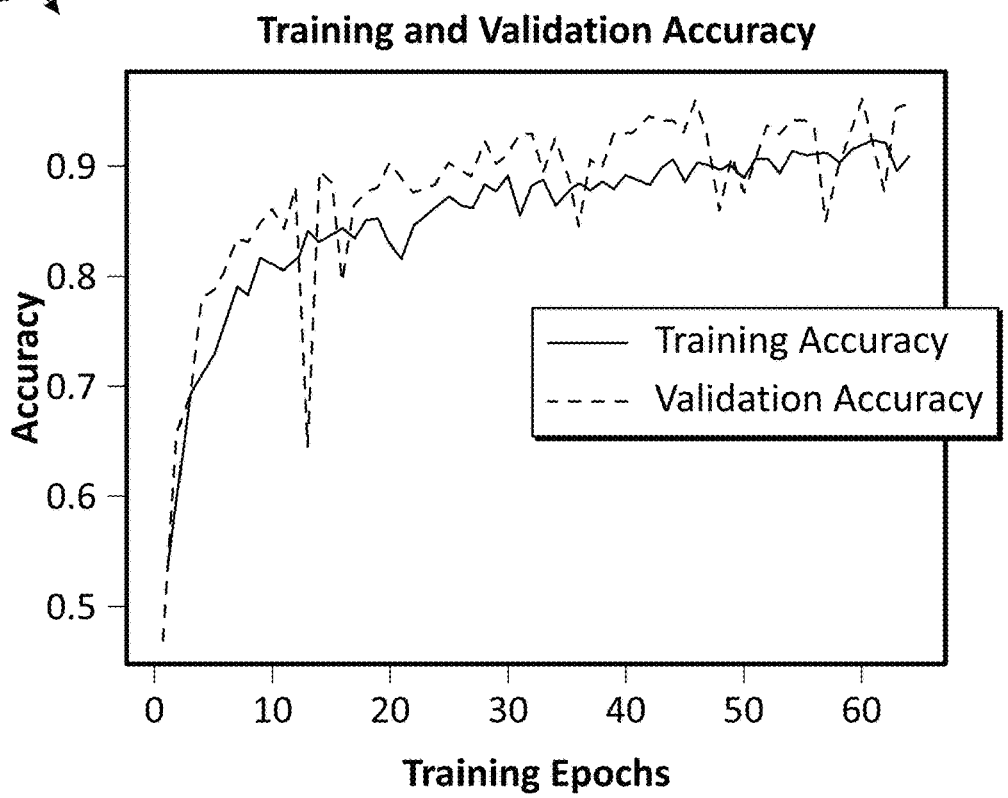
Figure 9B:
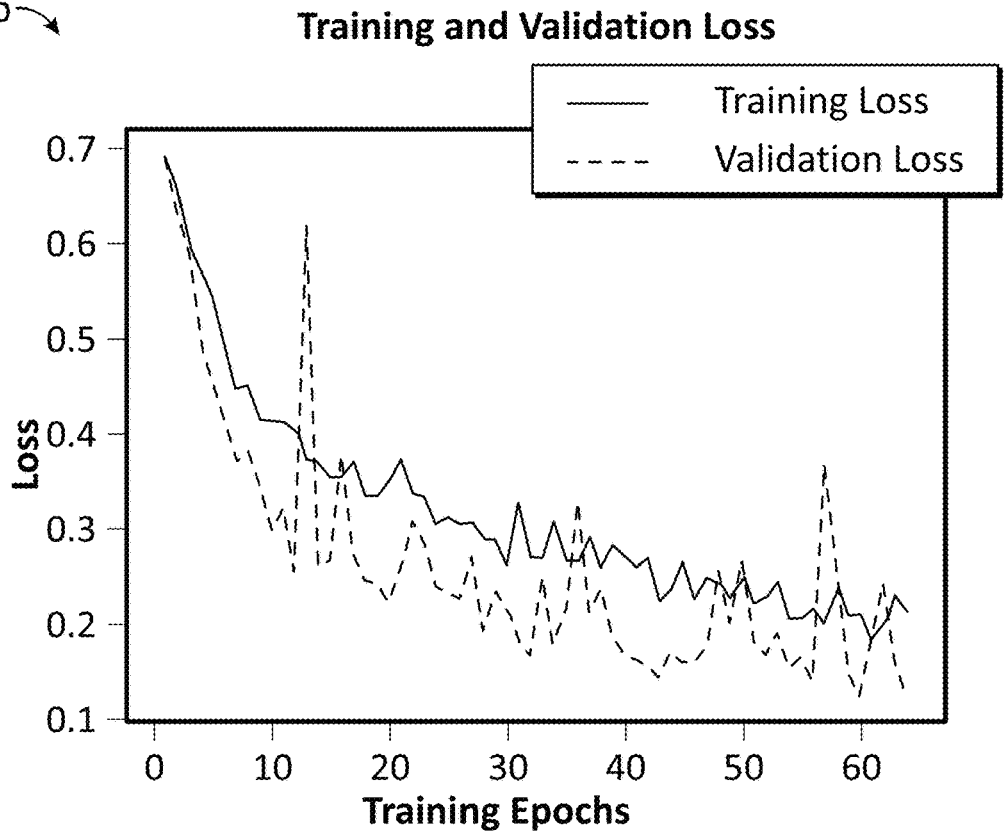

FIGS. 9A-B illustrate classification results for a neural network model trained for operational surface detection. Classifications 900*a* in FIG. 9A include different classifications resulting from a neural network model trained for sidewalk or another operational surface detection. Similarly, classification accuracies 900*b* in FIG. 9B show the accuracy of the neural network model in detecting the proper operational surface, and the associated loss, based on the number of training epochs.

For example, in classifications 900a, an output classification 975a shows the result of a neural network model as detecting a sidewalk within an input image and other input data. Classifications 900a include different output classification 975a-c based on input image data and a trained neural network for sidewalk detection. In output classification 975a, a sidewalk is detected by the camera-sensor fusion module using the trained neural network. Similarly, in output classification 975b, the trained neural network may output a no sidewalk classification when a sidewalk is not detected in the input image (and/or other input data, such as vibrational data, inertial measurements, and the like) and/or a different operational surface (e.g., a street) is detected. This trained neural network may be trained based on a training route through a location, such as training route 472 through location 470 or training route 872 through location 870. However, in output classification 975c, a sidewalk is detected when the input image (and/or other data) does not include a sidewalk, which indicates error in classification and output surface detection by the neural network model. Thus, retraining, rebalancing, and/or reweighting of the nodes within the neural network may be required for proper output classification by the neural network.

In classification results 980a 900a of classification accuracies 900b, an accuracy of a neural network model trained for operational surface detection over a number of training epochs. These training epochs correspond to a number of times all of the training vectors from the input data are processed and then used to update the weights as applied to the nodes of the hidden layers. This may include passing the training data (e.g., data detected by the camera-sensor fusion module) through the neural network training algorithm before weights are updated, and then updating the weights based on the results so that further epochs are more refined based on the classifications. As a number of epochs increases the neural network model is shown as becoming more accurate in predicting and classifying input data. In classification results 900b, loss is shown as decreasing based on the number of training epochs. Thus, as additional iterations of training occur, the loss value decreases and therefore the model behaves in a better manner as detecting operational surfaces.

Embodiments of the present disclosure can thus provide a camera-sensor fusion module that uses a neural network model to assist in detection of operational surfaces on which micro-mobility fleet vehicle is operated. Moreover, embodiments may also provide micro-mobility fleet vehicle controllers to control, limit, or otherwise enforce restrictions on operation of the micro-mobility fleet vehicles based on the operational surface, for example, to prevent unlawful or dangerous fleet vehicle usage by users and maintain service provider licensing, as described herein.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A fleet vehicle control system for a fleet vehicle of a plurality of fleet vehicles, the fleet vehicle control system comprising:
   a camera-sensor fusion package configured to detect sensor data of an operational surface on which the fleet vehicle operates, wherein the camera-sensor fusion package includes at least (1) a first sensor of a first type and (2) a second sensor of a second type that is different from the first type;
   one or more non-transitory computer-readable storage media embodying instructions; and
   one or more processors coupled to the non-transitory computer-readable storage media and operable to execute the instructions to cause the fleet vehicle control system to perform operations comprising:
   receiving, using the camera-sensor fusion package of the fleet vehicle, (1) first data associated with the operational surface, wherein the first data is captured by the first sensor and comprises at least image data of the operational surface in a field of view of the first sensor, and (2) second data associated with the operational surface, wherein the second data is captured by the second sensor which is different from the first sensor;
   determining, by the fleet vehicle using a fusion algorithm based on a neural network model, a surface classification of the operational surface, wherein the fusion algorithm switches between a first detection model configured to perform surface classification using the first data and a second detection model configured to perform surface classification using the second data, wherein the switching is determined based on one or more criteria associated with the first and second data, wherein the fusion algorithm is trained for surface classifications of operational surfaces associated with the plurality of fleet vehicles;
   determining an operational parameter comprising a restricted movement requirement for the fleet vehicle based, at least in part, on the surface classification; and
   causing the fleet vehicle to come to a stop based, at least in part, on the restricted movement requirement determined based on the surface classification.

2. The fleet vehicle control system of claim 1, wherein prior to the receiving, the operations further comprise:
   gaining access to the fusion algorithm with a controller associated with the plurality of fleet vehicles, the neural network model of the fusion algorithm trained using, at least in part, the second data captured by at least one of the plurality of fleet vehicles prior to the first data.

3. The fleet vehicle control system of claim 2, wherein the neural network model comprises a convolution neural network (CNN), and wherein the neural network model is further trained using at least one other pre-trained neural network model for the surface classification of the operational surfaces in at least one other location different from a location of the plurality of fleet vehicles.

4. The fleet vehicle control system of claim 2, wherein the operations further comprise:
transmitting the first data to the controller for an update to the neural network model; and
receiving the update to the neural network model.

5. The fleet vehicle control system of claim 1, wherein the first detection model is based on the image data captured by the first sensor of the camera-sensor fusion package, wherein the first sensor comprises a camera, and wherein the second detection model comprises an inertial measurement model for the surface classifications in inertial data detected by the second sensor comprising an inertial measurement unit (IMU) detector of the camera-sensor fusion package.

6. The fleet vehicle control system of claim 1, wherein the operations further comprise:
providing at least one of an audio notification or a visual notification of the causing the fleet vehicle to come to the stop through an interface of the fleet vehicle or a mobile device associated with the fleet vehicle.

7. The fleet vehicle control system of claim 6, wherein the camera-sensor fusion package further comprises an accelerometer, a gyroscope, or a magnetometer for the fleet vehicle, and wherein the second data comprises accelerometer data or vibrational data associated with the operational surface.

8. The fleet vehicle control system of claim 1, wherein the operations further comprise:
transmitting a notification to a mobile device associated with the fleet vehicle based on a controlling of an operation of the fleet vehicle, wherein the notification is associated with the operational surface of the fleet vehicle.

9. The fleet vehicle control system of claim 1, wherein the camera-sensor fusion package further comprises a GPS sensor, wherein the second data further comprises a geo-location of the fleet vehicle, and wherein the neural network model is further trained for regulatory boundaries within a location associated with the plurality of fleet vehicles.

10. A method for controlling operations for a plurality of fleet vehicles, the method comprising:
receiving, by a fleet vehicle of the plurality of fleet vehicles using camera-sensor fusion module, first image data of an operational surface in a field of view of the camera-sensor fusion module and inertial data of the fleet vehicle;
determining, by the fleet vehicle using a fusion algorithm based on a neural network model, a surface classification of the operational surface, wherein the fusion algorithm switches between a first detection model configured to perform surface classification using the first image data and a second detection model configured to perform surface classification using the inertial data, wherein the switching is determined based on one or more criteria associated with the first image data and the inertial data;
determining an operational parameter comprising a restricted movement requirement for the fleet vehicle based, at least in part, on the surface classification; and
causing the fleet vehicle to come to a stop based, at least in part, on the restricted movement requirement determined based on the surface classification.

11. The method of claim 10, wherein prior to the receiving, the method further comprises:
gaining access to the neural network model with a controller associated with the plurality of fleet vehicles, the neural network model trained using, at least in part, second image data captured by at least one of the plurality of fleet vehicles during a previous use on a training route through a location.

12. The method of claim 11, wherein the neural network model comprises a convolution neural network (CNN) trained using a plurality of input images from the second image data for input layers of the CNN.

13. The method of claim 11, wherein the surface classification comprises one of a street, a vehicle lane, or a sidewalk based on training images in the second image data and the first image data, wherein the second image data is generated and classified from a first-time travel on the training route through the location, and wherein the neural network model is further trained with additional neural network models.

14. The method of claim 11, further comprising:
receiving an update to the fusion algorithm based on additional training data from the plurality of fleet vehicles; and
updating, by the fleet vehicle, the fusion algorithm based on the update.

15. The method of claim 10, wherein the surface classification comprises a sidewalk and the operational parameter comprises a speed limit for the sidewalk, and wherein causing the fleet vehicle to come to the stop comprises:
engaging a resistor of an electric motor for the fleet vehicle; and
slowing the fleet vehicle to one of a lower speed than a present travel speed of the fleet vehicle until the stop using the engaging the resistor.

16. The method of claim 10, wherein the surface classification comprises a sidewalk and the operational parameter comprises a speed limit for the sidewalk, and wherein the operations further comprise:
presenting an alert associated with the speed limit through an output device of the fleet vehicle; and
monitoring a travel speed of the fleet vehicle for compliance with the speed limit prior to causing the fleet vehicle to come to the stop.

17. The method of claim 16, further comprising:
determining that the travel speed exceeds the speed limit for a period of time based on the monitoring;
determining a fee on an account of a user operating the fleet vehicle during the monitoring; and
transmitting the alert to the user of the fee.

18. The method of claim 10, wherein the neural network model is specific to a geo-fenced area corresponding to micro-mobility vehicles that comprise the plurality of fleet vehicles, and wherein the plurality of fleet vehicles each comprises camera-sensor fusion modules having a camera, an accelerometer, an IMU detector, and a GPS detector.

19. The method of claim 18, further comprising:
detecting, using the camera-sensor fusion modules of the plurality of fleet vehicles, additional operational data comprising at least one of movement data, vibrational data, or location data of the fleet vehicle based on the operational surface of the fleet vehicle,
wherein the determining the operational parameter is further based on the additional operation data, and wherein the neural network model is further trained on at least one of a weather status, a time of day, a lighting status, or a crowd congestion model.

\* \* \* \* \*